US012530850B2

(12) United States Patent
Pethe

(10) Patent No.: US 12,530,850 B2
(45) Date of Patent: Jan. 20, 2026

(54) GENERATING THREE-DIMENSIONAL ROWVIEW REPRESENTATION(S) OF ROW(S) OF AN AGRICULTURAL FIELD AND USE THEREOF

(71) Applicant: Deere & Company, Moline, IL (US)

(72) Inventor: Rhishikesh Pethe, Dublin, CA (US)

(73) Assignee: Deere & Company, Moline, IL (US)

( * ) Notice: Subject to any disclaimer, the term of this patent is extended or adjusted under 35 U.S.C. 154(b) by 33 days.

(21) Appl. No.: 17/487,197

(22) Filed: Sep. 28, 2021

(65) Prior Publication Data

US 2023/0104695 A1    Apr. 6, 2023

(51) Int. Cl.
| | |
|---|---|
| *G06T 19/00* | (2011.01) |
| *G01N 33/00* | (2006.01) |
| *G01W 1/02* | (2006.01) |
| *G06N 5/04* | (2023.01) |
| *G06T 7/00* | (2017.01) |

(Continued)

(52) U.S. Cl.
CPC ....... *G06T 19/003* (2013.01); *G01N 33/0098* (2013.01); *G01W 1/02* (2013.01); *G06N 5/04* (2013.01); *G06T 7/0016* (2013.01); *G06T 13/20* (2013.01); *G06V 20/188* (2022.01);
(Continued)

(58) Field of Classification Search
CPC ................... G06V 20/188; G06T 2207/30188
See application file for complete search history.

(56) References Cited

U.S. PATENT DOCUMENTS

| | | |
|---|---|---|
| 9,058,633 B2 | 6/2015 | Lindores et al. |
| 9,880,140 B2 | 1/2018 | Osborne et al. |

(Continued)

FOREIGN PATENT DOCUMENTS

WO    2019040866    2/2019

OTHER PUBLICATIONS

European Patent Office; International Search Report and Written Opinion of Application No. PCT/US2022/030675; 11 pages; dated Aug. 31, 2022.

(Continued)

*Primary Examiner* — Ryan McCulley
(74) *Attorney, Agent, or Firm* — HANLEY, FLIGHT & ZIMMERMAN, LLC

(57) ABSTRACT

Implementations are directed to generating corresponding three-dimensional ("3D") rowview representation(s) of row(s) of an agricultural field at various time instance(s) to enable a human operator of the agricultural field to virtually traverse through the row(s) at the various time instance(s). In some implementations, the corresponding 3D rowview representation(s) can be generated based on corresponding vision data captured at the various time instance(s). The corresponding 3D rowview representation(s) can be generated based on processing the corresponding vision data. Further, the corresponding 3D rowview representation(s) can be provided to a client device of the human operator of the agricultural field to enable the human operator to virtually traverse through the row(s) of the agricultural field at the various time instance(s). In some implementations, the corresponding 3D rowview representation(s) can be annotated with inference(s) made with respect to the row(s) and/or corresponding non-vision data obtained for the various time instance(s).

20 Claims, 9 Drawing Sheets

(51) Int. Cl.
  *G06T 13/20* (2011.01)
  *G06V 20/10* (2022.01)
  *G06N 5/022* (2023.01)
(52) U.S. Cl.
  CPC .... *G06N 5/022* (2013.01); *G06T 2207/30188* (2013.01); *G06T 2219/00* (2013.01)

(56) References Cited

U.S. PATENT DOCUMENTS

| | | |
|---|---|---|
| 10,930,065 B2 | 2/2021 | Grant et al. |
| 2019/0050948 A1 | 2/2019 | Perry et al. |
| 2019/0150357 A1 | 5/2019 | Wu et al. |
| 2020/0013230 A1* | 1/2020 | Miller ................ G06T 17/05 |
| 2020/0187406 A1* | 6/2020 | Redden ............... A01M 21/00 |
| 2021/0343402 A1* | 11/2021 | Acciaroli ............. G16H 40/63 |
| 2022/0121847 A1* | 4/2022 | Sibley ................. G06V 20/188 |
| 2022/0253757 A1* | 8/2022 | Harkiewicz ........... G06Q 10/04 |
| 2022/0318670 A1* | 10/2022 | Mudgil ............... G06F 18/23 |

OTHER PUBLICATIONS

Zhao et al., "Augmented Reality Application for Plant Learning" IEEE 9th International Conference on Software Engineering and Service Science (ICSESS), Beijing, China. pp. 1108-1111. (2018).

* cited by examiner

GENERATING THREE-DIMENSIONAL ROWVIEW REPRESENTATION(S) OF ROW(S) OF AN AGRICULTURAL FIELD AND USE THEREOF

BACKGROUND

Agricultural conditions can rapidly change at a localized and regional level, with some changes resulting in healthier crops and other changes resulting in degradation of agricultural environments. In some instances, pests can damage certain areas of crops without warning or recognition by those persons tasked with overseeing such areas—and despite such pests typically having an observable origin. In other instances, crops can reap benefits from weather that is moving through a region, and such crops may be able to leverage certain benefits from the weather, at least with prior preparation relative to the weather.

Although overhead imagery (e.g., satellite imagery or drone imagery) can be helpful for monitoring these variations in an agricultural environment, this overhead imagery may lack precise data, e.g., at the individual row or plant level, which otherwise could be harnessed to increase agricultural yields. Further, many robots (also referred as "rovers") and/or stationary vision components can also be helpful for monitoring these variations at the individual row or plant level in an agricultural environment (e.g., robot imagery or stationary imagery). In many instances, inferences can be made about the individual rows or plants based on this imagery and/or other non-image based information (e.g., weather patterns). However, those persons tasked with overseeing such areas may not be able to readily view these variations at the individual row or plant level over a duration of time, much less monitor these inferences over a duration of time or cause these inferences to be utilized to update machine learning models employed to make these inferences.

SUMMARY

Some implementations described herein relate to generating corresponding three-dimensional ("3D") rowview representations of rows of crops of an agricultural field based on corresponding vision data generated by vision component(s) at corresponding time instances. In some implementations, these corresponding 3D rowview representations enable a human operator of the agricultural field to virtually traverse through the rows of the agricultural field at the corresponding time instances. For example, assume that initial vision data is generated during an initial episode of the vision component(s) being transported along a given row of the agricultural field at an initial time instance, and assume that subsequent vision data is generated during a subsequent episode of the vision component(s) being transported along the given row of the agricultural field at a subsequent time instance that is subsequent to the initial time instance. In this example, an initial 3D rowview representation of the given row for the initial time instance can be generated based on the initial vision data, and a subsequent 3D rowview representation of the given row for the subsequent time instance can be generated based on the subsequent vision data. Further, the initial 3D rowview representation of the given row and the subsequent 3D rowview representation of the given row can be provided to a computing device of the human operator of the agricultural field to enable the human operator to virtually traverse along the given row at the initial time instance and the subsequent time instance, respectively. Put another way, the human operator can subsequently view these 3D rowview representations such that, from the perspective of the human operator, it appears that the human operator is in fact physically traversing along the given row at the initial time instance and/or the subsequent time instance based on the 3D rowview representations being viewed by the human operator (e.g., the initial 3D rowview representation or the subsequent 3D rowview representation).

In some implementations, the corresponding 3D rowview representations can be generated using one or more 3D reconstruction techniques. The one or more 3D reconstruction techniques can include, for example, a structure from motion technique, a monocular cues technique, a stereo vision technique, and/or other 3D reconstruction techniques. Continuing with the above example, in generating the initial 3D rowview representation of the given row, the initial vision data can be processed using one or more of the 3D reconstruction techniques to generate the initial 3D rowview representation for the initial time instance and the subsequent vision data can be processed using one or more of the 3D reconstruction techniques to generate the subsequent 3D rowview representation for the subsequent time instance. In some versions of those implementations, the one or more 3D reconstruction techniques utilized may depend on a type of the vision component(s) utilized in generating the corresponding vision data at the corresponding time instances. For instance, if the vision component(s) correspond to stereo cameras, then one or more stereo vision techniques may be utilized in generating the corresponding 3D rowview representations. Although particular 3D reconstruction techniques are described above, it should be understood that is for the sake of example and is not meant to be limiting and that any other 3D reconstruction technique that can be utilized to process corresponding vision data in generating corresponding 3D rowview representations.

In some implementations, one or more inferences can be made with respect to the agricultural field, the given row, and/or one or more of the crops of the given row based on processing the corresponding vision data. For instance, in some versions of those implementations, the corresponding vision data generated at the corresponding time instances can be processed, using one or more machine learning ("ML") models, to make one or more inferences with respect to the agricultural field, the given row, and/or one or more of the crops of the given row. The one or more ML models can include, for example, one or more convolutional neural networks ("CNNs") that are trained to make one or more inferences with respect to one or more of the crops of the given row, such as predicted yield inferences, predicted growth inferences, presence of pest inferences, presence of weeds inferences, presence of fungus inferences, irrigation inferences, undergrowth inferences, flooding inferences, soil inferences, and/or any other inferences with respect to the agricultural field, the given row, and/or one or more of the crops of the given row. Notably, in some instances, one or more CNNs can be trained to multiple of these inferences, whereas in other instances, a given CNN can be trained to make a corresponding one of these inferences. Continuing with the above example, the initial vision data can be processed, using one or more of the ML models, to make an initial inference with respect to at least one crop included of the given row at the initial time instance. Further, the subsequent vision data can be processed, using one or more of the ML models, to make a subsequent inference with respect to at least one crop included of the given row at the subsequent time instance. For instance, the initial inference may indicate that the at least one crop in the given row is healthy at the initial time instance, but the subsequent inference may indicate that the at least one crop in the given row is infected with a fungus at the subsequent time instance. Further, it can be inferred in this example that the fungus infected the at least one crop at some point in time between the initial time instance and the subsequent time instance.

In some versions of those implementations, the corresponding 3D rowview representations can be annotated with an indication of the one or more inferences made with respect to the agricultural field, the given row, and/or one or more of the crops of the given row based on processing the corresponding vision data. Continuing with the above example, the initial 3D rowview representation can be annotated with an indication of the one or more inferences made with respect to the at least one crop that indicates the at least one crop is healthy at the initial time instance. Further, the subsequent 3D rowview representation can be annotated with an indication of the one or more inferences made with respect to the at least one crop that indicates the at least one crop is infected with a fungus at the subsequent time instance. For instance, these indications that are utilized in annotating the corresponding 3D rowview representations can be selectable such that the human operator can select the individual crops in the 3D rowview representations to cause the annotations to be provided for visual presentation to the human operator of the client device.

In some versions of those implementations, and in response to determining that the corresponding inferences made with respect to the agricultural field, the given row, and/or one or more of the crops of the given row based on processing the corresponding vision data at different time instances do not make, a corresponding notification can be generated and provided for visual and/or audible presentation to the human operator of the client device. Continuing with the above example, the initial inference that indicates the at least one crop is healthy can be compared to the subsequent inference that indicates the at least one crop is infected with fungus. Further, based on the difference between the initial inference and the subsequent inference, a notification can be generated and provided for presentation to the human operator via the client device to alert the human operator to the fungus that has infected the at least one crop. Accordingly, the human operator can subsequently validate the initial inference and/or the subsequent inference (e.g., via user input directed to the client device to indicate whether the initial inference and/or the subsequent inference are correct inferences) and/or cause some action to be performed to address the fungus that has infected the at least one crop if the subsequent inference is a correct inference (e.g., send a robot to investigate or remove the fungus, cause a subrogation report to be generated based on the fungus, etc.).

In some versions of those implementations, and in response to determining that the corresponding inferences made with respect to the agricultural field, the given row, and/or one or more of the crops of the given row based on processing the corresponding vision data at different time instances do not make, an update for the one or more ML models utilized in generating the one or more inferences can be generated. Continuing with the above example, the initial inference that indicates the at least one crop is healthy can be compared to the subsequent inference that indicates the at least one crop is infected with fungus, and the notification can be generated and provided for presentation to the human operator via the client device to alert the human operator to the fungus that has infected the at least one crop. However, assume that, in reviewing the subsequent 3D rowview representation, the human operator concludes that the at least one crop is not infected with the fungus as indicated by the subsequent inference and directs user input to the client device to that effect. In this example, an update for the one or more ML models utilized in making the subsequent inference that indicates the at least one crop is infected with fungus can be generated and utilized to update the one or more ML models (e.g., via backpropagation). The update can correspond to, for instance, one or more training examples that are generated based on the user input and subsequently utilized to update the one or more ML models in a subsequent iteration of training, one or more updated weights utilized to replace one or more current weights utilized by the one or more ML models, and/or any other update that may be utilized for updating the one or more ML models. Although the above example is provided with respect to generating the update based on the user input of the human operator, it should be understood that is for the sake of example and is not meant to be limiting. For instance, in some scenarios where the corresponding inferences are not provided for presentation to the human operator, such as in instances where the inferences can be utilized to positively reinforce one or more of the corresponding inferences made by one or more of the ML models.

In some implementations, corresponding non-vision data generated by non-vision component(s) can be obtained before or during the corresponding time instances. The non-vision component(s) can include any sensor(s) that are in addition to the vision component(s) such as, for example, meteorological sensors that are capable of detecting wind speed and direction, relative humidity, barometric pressure, precipitation, and solar radiance, soil sensors that are capable of detecting soil content, soil moisture, soil pH, location sensors that are capable of detecting a location of the agricultural field, the given row, and/or one or more of the crops of the given row (and optionally using a global mapping relative to the Earth or a local mapping relative to the agricultural field), and/or any other non-vision component(s) that are capable of generating information that may be useful to the human operator of the agricultural field. Continuing with the above example, initial non-vision generated by the meteorological sensors before or during the initial time instance can be utilized to determine a weather pattern associated with the initial time instance, and subsequent non-vision generated by the meteorological sensors before or during the subsequent time instance can be utilized to determine a weather pattern associated with the subsequent time instance.

In some versions of those implementations, the corresponding 3D rowview representations can be annotated with an indication of the non-vision data associated with the agricultural field, the given row, and/or one or more of the crops of the given row based on processing the corresponding non-vision data. Continuing with the above example, the initial 3D rowview representation can be annotated with an indication that the agricultural field has been experiencing a drought for several days or weeks up until the initial time instance. Further, the subsequent 3D rowview representation can be annotated with an indication that the agricultural field has recently experienced torrential rains subsequent to the initial time instance, but before the subsequent time instance. Moreover, and assuming that the subsequent inference made with respect to the at least one crop indicates that the at least one crop is infected with a fungus, it can be determined that the fungus was caused by the torrential rains between the initial time instance and the subsequent time instance.

In some versions of those implementations, an indication of the corresponding non-vision data associated with the agricultural field, the given row, and/or one or more of the crops of the given row can be provided as input to one or more of the ML models (along with the corresponding vision data) utilized in making the one or more inferences as described above. Continuing with the above example, assume that the subsequent inference made with respect to the at least one crop indicates that the at least one crop is infected with a fungus, and that fungal spores are also detected in the vicinity of the at least one crop. In this example, the wind speed and direction can be utilized to identify other crops or rows of crops in the agricultural field that may be susceptible to future fungal infection based on the wind carrying the fungal spores at a particular speed and in a particular direction. Accordingly, in this example, the human operator can cause one or more proactive measures to be performed to reduce the impact of the fungal spores (e.g., spraying of the other crops or the other rows of crops in the agricultural field that may be susceptible to future fungal infection).

In some implementations, a 3D rowview representation time-lapse sequence can be generated when there are multiple 3D rowview representations of a given row. The 3D rowview representation time-lapse sequence of the row of the agricultural field can include, for example, a rowview animation of the row of the agricultural field across the corresponding time instances. For instance, the rowview animation can illustrate how one or more annotations generated based on the one or more inferences evolve over the corresponding time instances, how one or more annotations generated based on the non-vision evolve over the corresponding time instances, and/or other information that can be interpolated and/or extrapolated based on the corresponding 3D rowview representations of the given row. Continuing with the above example, the 3D rowview representation time-lapse sequence can be generated based on at least the initial 3D rowview representation of the given row, the subsequent 3D rowview representation of the given row, indications of any inferences made with respect to the agricultural field, the given row, and/or one or more of the crops of the given row at the initial time instance and/or the subsequent time instance, indications of any non-vision data associated with the agricultural field, the given row, and/or one or more of the crops of the given row at the initial time instance and/or the subsequent time instance, and/or any other data. In this example, the 3D rowview representation time-lapse sequence can also include various graphics, such as animated rain between the initial time instance and the subsequent time instance, animated growth of the fungal infection after the rain and before the subsequent time instance, and/or other information to better inform the human operator of how the agricultural field has evolved over the corresponding time instances.

In some implementations, the vision component(s) can generate the corresponding vision data at one or more of the corresponding time instances while being mechanically coupled to a robot that is traversing through the rows of the agricultural field during corresponding episodes of locomotion. For example, a robot can periodically (e.g., every day, once a week, once a month, etc.) or non-periodically (e.g., at non-regular time intervals) traverse through one or more of the rows of the agricultural field to perform various operations and cause the vision component(s) to generate the corresponding vision data while the robot is traversing through the rows. In additional or alternative implementations, the vision component(s) can generate the corresponding vision data at one or more of the corresponding time instances while being mechanically coupled to farm machinery that is traversing through the rows of the agricultural field during corresponding episodes of locomotion. For example, a module that includes the vision component(s) can be mechanically coupled to the farm machinery to generate the corresponding vision data while the farm machinery is traversing through the rows of the agricultural field. In additional or alternative implementations, the vision component(s) can generate the corresponding vision data at one or more of the corresponding time instances while being stationary and fixed on crop(s) or row(s) of crop. For example, one or more modules that include the vision component(s) can be fixed on a single crop, a group of crops of a given row of crops, multiple rows of crops, etc. In this example, the corresponding 3D rowview representations can be generated based on corresponding vision data from multiple modules assuming that a given module does not capture an entire row.

In various implementations, one or more localization techniques can be utilized to determine whether and/or when the vision component(s) are being transported along a new row of crops or along a row of crops for which a corresponding 3D rowview representation has been generated. For example, one or more location sensors can be utilized to determine a location of the vision component(s), and the corresponding 3D rowview representations can be stored in association with location data (e.g., GPS data, GLONASS data, etc.) that characterizes the location of the vision component(s) for the corresponding vision data. Additionally, or alternatively, the location data can be compared to a previously stored local mapping of the agricultural field to determine a relative location of the vision component(s) for the corresponding vision data (e.g., row 5 in the northwest corn field). In additional or alternative implementations, one or more fiducial markings or RFID tags that were previously applied to the crop(s) or row(s) of crops can be captured in the corresponding vision data, and utilized to determine a location of the vision component(s), and the corresponding 3D rowview representations can be stored in association with the fiducial markings and/or RFID data that characterizes the location of the vision component(s) for the corresponding vision data. Accordingly, the corresponding 3D rowview representations can also be annotated with information related to the rows of the agricultural field to enable the human operator to readily ascertain an exact location in the agricultural field that is associated with the corresponding 3D rowview representations.

As used herein, the term "time instance" is a temporal construct that refers to a single point in time and/or range of time. For example, in implementations where the vision component(s) are transported along a given row of an agricultural field, a time instance for which a corresponding 3D rowview representation can be generated may correspond to a duration of time that passes from the robot or farm machinery beginning traversing along the given row of the agricultural field to completing traversing along the given row of the agricultural field. Also, for example, in implementations where the vision component(s) are stationary and fixed along a given row of an agricultural field, a time instance for which a corresponding 3D rowview representation can be generated may correspond to a pre-defined duration of time that passes (e.g., based on corresponding vision data generated across an hour period) or a single instance in time (e.g., based on corresponding vision data generated every day at noon).

By using techniques described herein, one or more technological advantages may be achieved. As one non-limiting example, techniques described herein enable the human operator to virtually traverse through the rows of the agricultural field using the corresponding 3D rowview representations generated at the various corresponding time instances. Further, the corresponding 3D rowview representations generated at the various corresponding time instances can include the annotations of the indications of inferences made at the various corresponding time instances and the indications of non-vision data obtained at the various corresponding time instances. As a result, the human operator can cause various agricultural operations to be performed based on the inferences and/or the non-vision data to address adverse agricultural issues and/or to mitigate future agricultural issues, thereby preserving the crops and increasing future yield and/or quality of the crops. For example, if an inference is made that indicates a given crop has a fungal infection, then agricultural operations can be performed to remove or cure the fungal infection, and measures additional agricultural operations can be performed to ensure the impact of the fungal infection is minimized with respect to other crops that are at a higher risk of subsequently becoming infected. Moreover, the inferences made at the various corresponding time instances can be utilized to update the one or more ML models utilized in making the inferences. For example, if an inference is made that indicates a given crop has a fungal infection, but the human operator, upon viewing the corresponding 3D rowview representation determines that the perceived fungal infection is not, in fact, a fungal infection, then the one or more ML models utilized in making the inference can be updated based on the input provided by the human operator.

Furthermore, the corresponding 3D rowview representations generated at the various corresponding time instances can enable the human operator to easily identify locations where certain inferences have been detected in the agricultural field. As a result, a quantity of user inputs received at the client device may be reduced since a user need not repeatedly query a system to identify a location where the certain inferences were detected and enabling the human operator to virtually traverse those locations, thereby conversing computational and/or network resources. For example, by generating the notifications based on the inferences made at the various time instances and correlating the inferences to a mapping of the agricultural field, the human operator knows the specific rows and/or crops associated with the inferences. In contrast, if the user was notified with respect to longitude and latitude coordinates, the user may then need to utilize the client device to query these coordinates one or more times to identify the location of these longitude and latitude coordinates within the agricultural field.

The above description is provided as an overview of only some implementations disclosed herein. Those implementations, and other implementations, are described in additional detail herein.

DETAILED DESCRIPTION

Figure 1:
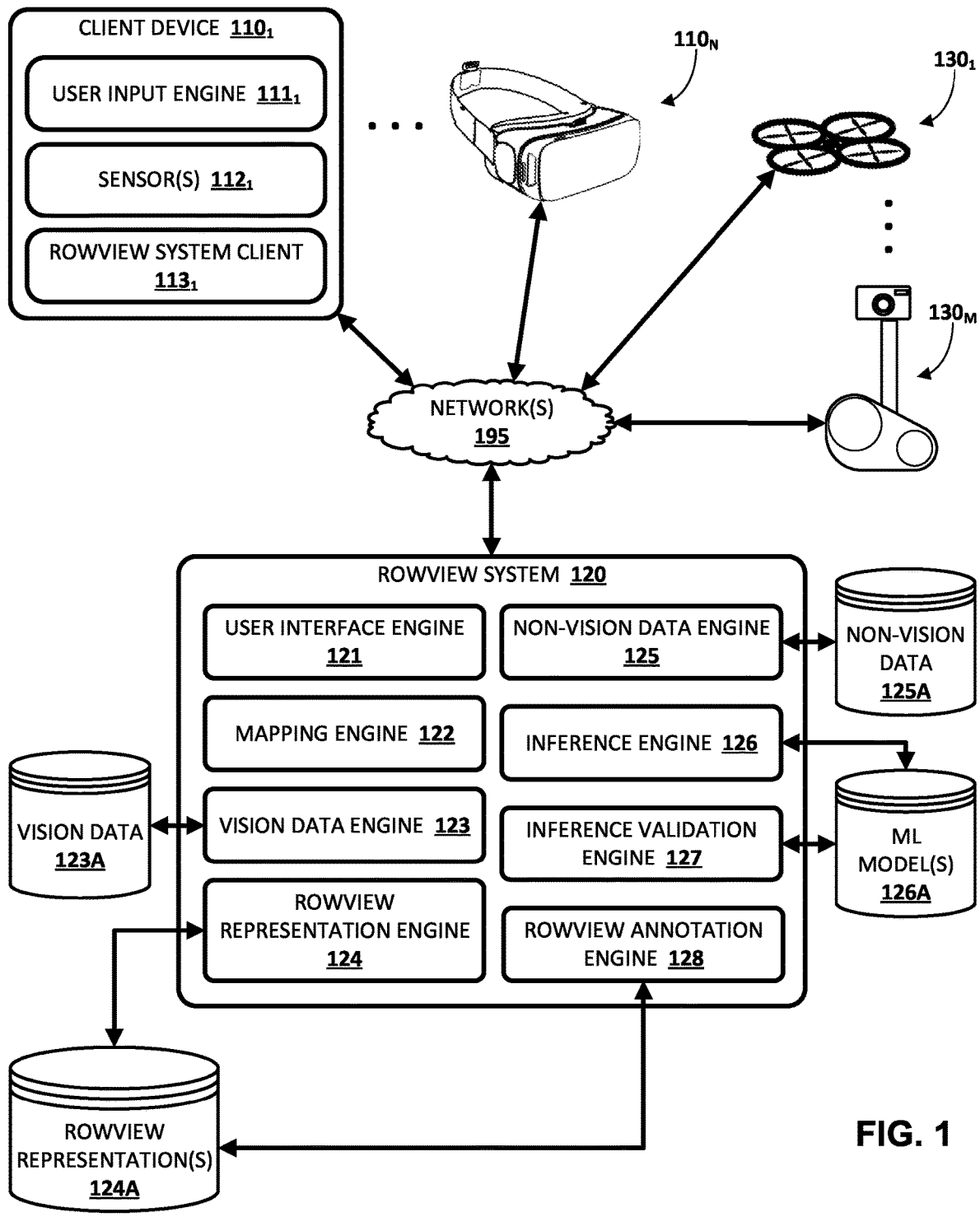
FIG. 1 depicts a block diagram of an example environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of client devices $110_{1-N}$, a rowview system 120, and a plurality of robots $130_{1-M}$. Each of these components $110_{1-N}$, 120, and $130_{1-M}$ may communicate, for example, through one or more networks 195. The rowview system 120 is an example of an information processing and retrieval system in which the systems, components, and techniques described herein may be implemented and/or with which systems, components, and techniques described herein may interface.

In various implementations, an individual (which in the current context may also be referred to as a "user") may operate one or more of the client devices $110_{1-N}$ to interact with other components depicted in FIG. 1. As noted above, each component depicted in FIG. 1 may be coupled with other components through one or more of the networks 195, such as a local area network ("LAN"), or wide area network ("WAN") such as the Internet. The client devices $110_{1-N}$ may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an augmented reality ("AR") or virtual reality ("VR") immersive computing experience, a "smart" watch, and so forth. Additional and/or alternative client devices may be provided.

Each of the client devices $110_{1-N}$ and the rowview system 120 may include one or more memories for storage of data and software applications, one or more processors for accessing data and executing applications, and other components that facilitate communication over one or more of the networks 195. The operations performed by one or more of the client devices $110_{1-N}$ and/or the rowview system 120 may be distributed across multiple computer systems. For example, the rowview system 120 may be implemented as, for example, computer programs running on one or more computers in one or more locations that are coupled to each other through one or more of the networks 195.

Each of the client devices $110_{1-N}$ may operate a variety of different components that may be used, for instance, to generate or view a local mapping of an agricultural field and/or utilize the mapping in performance of one or more agricultural operations as described herein. For example, a first client device $110_1$ may include user input engine 1111 to detect and process user input (e.g., spoken input, typed input, and/or touch input) directed to the first client device $110_1$. As another example, the first client device $110_1$ may include a plurality of sensors 1121 to generate corresponding sensor data. The plurality of sensors can include, for example, global positioning system ("GPS") sensors to generate GPS data capturing GPS coordinates, vision components to generate vision data, microphones to generate audio data based on spoken input directed to the first client device $110_1$ and detected via the user input engine 1111, and/or other sensors to generate corresponding audio data. As yet another example, the first client device $110_1$ may operate a rowview system client 1131 (e.g., which may be standalone or part of another application, such as part of a web browser) to interact with the rowview system 120. Further, another client device 110N may take the form of an HMD that is configured to render two-dimensional ("2D") and/or three-dimensional ("3D") data to a wearer as part of a VR immersive computing experience. For example, the wearer of client device 110N may be presented with 3D point clouds representing various aspects of objects of interest, such as crops, fruits of crops, particular portions of an agricultural field, and so on. Although not depicted, the another client device 110N may include the same or similar components as the first client device 110N. For example, the another client device 110N may include respective instances of a user input engine to detect and process user input, a plurality of sensors to generate corresponding sensor data, and/or a rowview system client to interact with the rowview system 120.

In various implementations, the rowview system 120 may include user interface engine 121, mapping engine 122, vision data engine 123, rowview representation engine 124, non-vision data engine 125, inference engine 126, inference validation engine 127, and rowview annotation engine 128 as shown in FIG. 1. In some implementations one or more of engines 121, 122, 123, 124, 125, 126, 127, and/or 128 may be omitted. In some implementations all or aspects of one or more of engines 121, 122, 123, 124, 125, 126, 127, and/or 128 may be combined. In some implementations, one or more of engines 121, 122, 123, 124, 125, 126, 127, and/or 128 may be implemented in a component that is separate from rowview system 120. In some implementations, one or more of engines 121, 122, 123, 124, 125, 126, 127, and/or 128, or any operative portion thereof, may be implemented in a component that is executed, in part or exclusively, by one or more of the client devices $110_{1-N}$.

The rowview system 120 can be utilized to generate three-dimensional ("3D") rowview representations of row(s) of an agricultural field at various time instances. As used herein, a 3D rowview representation of a given row of an agricultural field refers to a 3D reconstructed representation of the given row that is generated based on processing vision data generated by vision component(s) that captures one or more crops, included in the given row of the agricultural field, at a given time instance. In some implementations, the 3D rowview representation of the given row enables a human operator of the agricultural field to virtually traverse along the given row as if the human operator was physically traversing along the given row at the given time instance (e.g., as described with respect to FIGS. 3, 5A, and 5B). For example, the 3D rowview representation of the given row can be provided for presentation to the human operator via one or more of the client devices $110_{1-N}$, and the human operator can provide various user inputs to virtually traverse along the given row at the given time instance using the 3D rowview representation. In additional or alternative implementations, the 3D rowview representation of the given row enables the human operator of the agricultural field to validate various inferences made with respect one or more crops included in the given row, the given row, or the agricultural field (e.g., as described with respect to FIGS. 4 and 5C). For example, the 3D rowview representation of the given row can be annotated with various inferences (and/or other information described herein) prior to being provided for presentation to the human operator via one or more of the client devices $110_{1-N}$, and the human operator can validate whether the inferences are accurate without having to physically travel to a location in the given row that is associated with the inferences.

Figure 2:
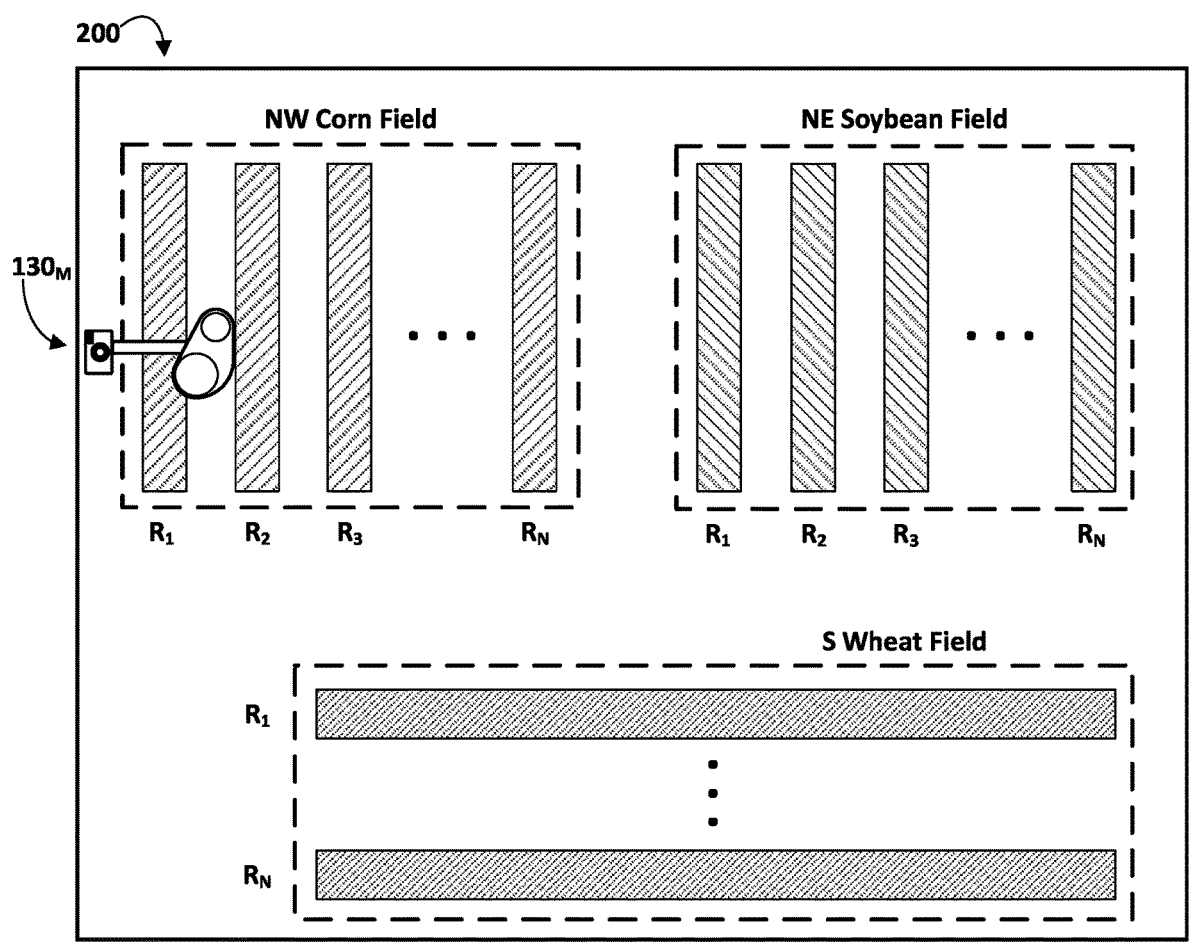
FIG. 2 depicts various non-limiting examples of an agricultural field to illustrate aspects of the present disclosure, in accordance with various implementations.

For example, and referring briefly to FIG. 2, an agricultural field 200 is depicted. For the sake of example, assume that a local mapping of agricultural field 200 is known. The local mapping of the agricultural field refers to, for example, a mapping of the agricultural field 200 that is defined with respect to a local or relative coordinate system defined by corresponding semantic identifiers, as opposed to being defined with respect to a global coordinate system (e.g., longitude and latitude coordinates, GPS coordinates, and/or other global coordinates). Further, the local or relative coordinate system can be generated based at least in part on corresponding semantic identifiers assigned to agricultural plots included in the agricultural field 200 and/or assigned to a plurality of rows of crops included in the agricultural field 200. For example, the local mapping of the agricultural field 200 can include a first agricultural plot that is assigned a corresponding semantic identifier of NW (north-west) corn field and that has a plurality of rows assigned corresponding semantic identifiers of first row $R_1$, second row $R_2$, third row $R_3$, and so on through Nth row $R_N$ for the NW corn field; a second agricultural plot that is assigned a corresponding semantic identifier of NE (north-east) soybean field and that has a plurality of rows assigned corresponding semantic identifiers of first row $R_1$, second row $R_2$, third row $R_3$, and so on through Nth row $R_N$ for the NE soybean field; and a third agricultural plot that is assigned a corresponding semantic identifier of S (south) wheat field and that has a plurality of rows assigned corresponding semantic identifiers of first row $R_1$ and so on through Nth row $R_N$ of the S wheat field. In some implementations, the corresponding semantic identifiers assigned to the agricultural plots of the agricultural field 200 and/or the rows of the agricultural plots can be assigned based on user input (e.g., provided by one or more of the client devices $110_{1-N}$ and obtained by the rowview system 120 via the user interface engine 121). In additional or alternative implementations, one or more techniques can be utilized to automatically assign the corresponding semantic identifiers assigned to the agricultural plots of the agricultural field 200 and/or the rows of the agricultural plots.

In some implementations, the vision data generated by the vision component(s) can be generated as the vision component(s) are being transported along a given row of an agricultural field. In some versions of those implementations, the vision component(s) can be mechanically coupled to a robot that is traversing along the given row of the agricultural field 200. For example, the vision component(s) can be integral to the robot $130_M$ traversing along the first row $R_1$ of the NW corn field as shown in FIG. 2, and the vision data utilized in generating the 3D representation of the first row $R_1$ of the NW corn field can be generated by the vision component(s) of the robot $130_M$ as it traverses along the first row $R_1$ of the NW corn field. In additional or alternative implementations (and although not depicted in FIG. 2), the vision component(s) can be mechanically coupled to farm machinery that is traversing along the given row of the agricultural field 200. For example, the vision component(s) can be included in a module that is mechanically coupled to the farm machinery, and the vision data utilized in generating the 3D representations described herein can be generated by the vision component(s) of the farm machinery traverses along the rows. In additional or alternative implementations (and although not depicted in FIG. 2), the vision component(s) can be fixed on one or more crops of the given row of the agricultural field 200. For example, the vision component(s) can be included in a stationary module that is in a fixed location in the agricultural field 200. In some of these examples, multiple stationary modules can be in various fixed locations in the agricultural field 200 to ensure the vision data captures each of the crops included in each of the rows.

Referring back to FIG. 1, in some implementations, the mapping engine 122 can utilize the local mapping described above with respect to FIG. 2 to localize the vision component(s) as they are being transported through the agricultural field and/or the fixed location. In additional or alternative implementations, the mapping engine 122 can utilize a global mapping (e.g., longitude and latitude coordinates, GPS coordinates, and/or other global coordinates) to localize the vision component(s) as they are being transported through the agricultural field and/or the fixed location. Accordingly, when the 3D rowview representations are generated based on the vision data as described herein, the 3D rowview representations can be stored in association with an indication of the location for which the 3D rowview representations are generated (e.g., the first row $R_1$ of the NW corn field, longitude and latitude coordinates <37.2431° N, 115.7930° W> (or a range thereof) corresponding the first row $R_1$ of the NW corn field, etc.) in one or more databases (e.g., in rowview representation(s) database 124A).

The vision data engine 123 can obtain vision data to be utilized in generating the 3D rowview representations described herein. In some implementations, the vision data engine 123 can obtain the vision data as it is generated by the vision component(s) and over one or more of the networks 195. In additional or alternative implementations, the vision data can be stored in one or more databases as it is generated (e.g., in vision data database 123A), and the vision data engine 123 can subsequently obtain the vision data from one or more of the databases to generate the 3D rowview representations described herein. In various implementations, the vision data can be associated with an indication of data that indicates a time instance at which the vision data was generated (e.g., a timestamp or sequence of timestamps that indicate when the vision data was generated). Accordingly, the 3D rowview representation generated based on the vision data can also be associated with the data that indicates a time instance at which the vision data was generated.

The rowview representation engine 124 can process the vision data to generate the 3D rowview representations described herein. Further, the rowview representation engine 124 can cause the 3D rowview representations to be stored in one or more databases (e.g., in the rowview representation(s) database 124A), and optionally in association with the indication of the location for which the 3D rowview representations are generated (e.g., as described above with respect to the mapping engine 122) and/or the indication of data that indicates a time instance at which the vision data was generated (e.g., as described above with respect to the vision data engine). For example, the rowview representation engine 124 can process the vision data using one or more 3D reconstruction techniques to generate the 3D rowview representations based on the vision data. The one or more 3D reconstruction techniques can include, for example, a structure from motion technique, a monocular cues technique, a stereo vision technique, and/or other 3D reconstruction techniques. In some implementations, the one or more 3D reconstruction techniques utilized may depend on a type of the vision component(s) utilized in generating the corresponding vision data. For instance, if the vision component(s) correspond to stereo cameras, then one or more stereo vision techniques may be utilized in generating the 3D rowview representations. Although particular 3D reconstruction techniques are described above, it should be understood that is for the sake of example and is not meant to be limiting and that any other 3D reconstruction technique that can be utilized to process corresponding vision data in generating corresponding 3D rowview representations.

In various implementations, the rowview representation engine 124 can generate a 3D rowview representation time-lapse sequence of a given row when multiple 3D rowview representations of the given row are available across multiple disparate time instances. The 3D rowview time-lapse sequence of the row of the agricultural field can include, for example, a rowview animation of the row of the agricultural field across the corresponding time instances. For instance, the rowview animation can illustrate how one or more annotations generated based on the one or more inferences evolve over the corresponding time instances, how one or more annotations generated based on the non-vision evolve over the corresponding time instances, and/or other information that can be interpolated and/or extrapolated based on the corresponding 3D rowview representations of the given row. These annotations are described in more detail below (e.g., with respect to the rowview annotation engine 128 of FIG. 1). Further, the 3D rowview representation time-lapse sequence of a given row is described in more detail below (e.g., with respect to FIGS. 3 and 5A-5C).

The non-vision data engine 125 can obtain non-vision data generated by non-vision component(s) that are in addition to the vision component(s) utilized to generate the vision data. The non-vision component(s) can include any sensor(s) that are in addition to the vision component(s) such as, for example, meteorological sensors that are capable of detecting wind speed and direction, relative humidity, barometric pressure, precipitation, and solar radiance, soil sensors that are capable of detecting soil content, soil moisture, soil pH, location sensors that are capable of detecting a location of the agricultural field, the given row, and/or one or more of the crops of the given row (and optionally using a global mapping relative to the Earth or a local mapping relative to the agricultural field), and/or any other non-vision component(s) that are capable of generating information that may be useful to the human operator of the agricultural field. In some implementations, the non-vision component(s) may be integrated into one or more of the robots $130_{1-M}$ and/or farm machinery utilized to transport the vision component(s) along the row(s) of the agricultural field. In additional or alternative implementations, the non-vision component(s) may be external to one or more of the robots $130_{1-M}$ and/or farm machinery utilized to transport the vision component(s) along the row(s) of the agricultural field. In various implementations, the non-vision data can also be associated with an indication of data that indicates a time instance at which the non-vision data was generated (e.g., a timestamp or sequence of timestamps that indicate when the non-vision data was generated). Notably, the indication of data that indicate the time instances at which the vision data was generated and at which the non-vision data enable the vision data and the non-vision data to be correlated at various time instances, such that temporally corresponding instances of vision data and non-vision data can be identified.

The inference engine 126 can process the vision data and/or the non-vision data for a given time instance to make one or more inference(s) with respect to the agricultural field, a given row of the agricultural field, and/or one or more of the crops of the given row of the agricultural field. In some implementations, one or more databases may be provided to store vision data processing model(s) or machine learning ("ML") model(s) (e.g., ML model(s) database 126A). The vision data processing model(s) or ML model(s) may employ various vision data processing techniques, such as edge detection, ML inference(s), segmentation, etc., to detect one or more bounding shapes that enclose an agricultural plot (e.g., the bounding boxes around the agricultural plots shown in FIG. 2) and/or a corresponding row of the agricultural plot from among a plurality of rows of each of the one or more agricultural plots. The ML techniques can utilize machine learning models including, for example, convolutional neural networks ("CNNs"), a sequence-to-sequence network such as encoder-decoder network, and/or any other machine learning model capable of processing the vision data and/or the non-vision data to identify the agricultural plot(s), the row(s) of the agricultural plot(s), and/or the crop(s) of the row(s) of the agricultural plot(s). The vision data and/or the non-vision data may be applied as input across these ML model(s) to generate output, and one or more of the inferences may be determined based on the output generated across the ML model(s).

In some implementations, ML model(s) may be utilized to identify a respective genus and/or species of plant corresponding to the crop(s). For example, a different ML model may be trained to identify respective genus and/or species of plant. For instance, one CNN may be trained to identify corn stalks, another may be trained to identify soybean stalks, another may be trained to identify strawberry plants, another may be trained to identify tomato plants, etc. As another example, a single machine learning model may be trained to identify plants across multiple species or genera. Further, the ML model(s) may additionally or alternatively be capable of processing the vision data and/or the non-vision data to make one or more inference(s) with respect to the agricultural plot(s), the row(s) of the agricultural plot(s), and/or the crop(s) of the row(s) of the agricultural plot(s). The one or more inferences can include, for example, predicted yield inferences, predicted growth inferences, presence of pest inferences, presence of weeds inferences, presence of fungus inferences, irrigation inferences, undergrowth inferences, flooding inferences, soil inferences, and/or any other inferences with respect to the agricultural plot(s), the row(s) of the agricultural plot(s), and/or the crop(s) of the row(s) of the agricultural plot(s). Similarly, a different ML model may be trained to make one or more of the inferences, or a single machine learning model may be trained to make multiple of the one or more inferences. For instance, one CNN may be trained to make predicted yield inferences and predicted growth inferences, another may be trained to make presence of pest inferences, presence of weeds inferences, and presence of fungus inferences, and so on. As another example, one CNN may be trained to make predicted yield inferences, another may be trained to make predicted growth inferences, another may be trained to make presence of pest inferences, another may be trained to make presence of weeds inferences, and so on.

In some implementations, the inference validation engine 127 can generate, based on one or more of the inferences made using the inference engine 126 and with respect to the agricultural plot(s), the row(s) of the agricultural plot(s), and/or the crop(s) of the row(s) of the agricultural plot(s), a notification to be provided for visual and/or audible presentation to the human operator of the agricultural field via one or more of the client devices $110_{1-N}$. The notification can include an indication of the one or more inferences made, and request that the human operator provide user input to validate one or more of the inferences (e.g., touch input or spoken input detected via the user input engine 1111-N of one or more of the client device $110_{1-N}$ and communicated to the rowview system view the user interface engine 121). For example, assume an inference made by the inference engine 126 indicates that a given crop in the first row $R_1$ of the NW corn field from FIG. 2 is wilting. In this example, and while viewing the given crop via a 3D rowview representation of the first row $R_1$ of the NW corn field, the human operator can be presented with the notification that requests the human operator verify whether or not the given crop is, in fact, wilting. In some additional or alternative implementations, the inference validation engine 127 can determine, based on comparing one or more of the inferences made using the inference engine 126 at a time instance with one or more additional inferences made using the inference engine 126 at an additional time instance, whether one or more of the inferences are correct. For example, again assume an inference made by the inference engine 126 indicates that a given crop in the first row $R_1$ of the NW corn field from FIG. 2 is wilting at a time instance. However, assume an additional inference made by the inference engine 126 indicates that the given crop in the first row $R_1$ of the NW corn field from FIG. 2 is not wilting at an additional time instance (e.g., a day after the time instance). In this example, the inference validation engine 127 can infer (and without the human operator providing any user input) that the wilting inference was an incorrect inference (and optionally assuming that the given crop was not irrigated and the non-vision data indicates that it did not rain). Rather, in this example, the inference validation engine 127 can infer that the incorrect inference was made based on, for example, vision data that includes poor lighting.

In some versions of those implementations, the inference validation engine 127 can generate an update for the ML model(s) utilized in making one or more of the inferences based on the validation of one or more of the inferences. For example, in implementations where the human operator provides user input to validate one or more of the inferences, a corresponding ground truth label (or ground truth value, such as a ground truth probability, ground truth binary value, or ground truth log likelihood) can be generated based on the user input. The ground truth label (or the ground truth value) can be compared to a predicted label (or predicted value, such as a predicted probability, predicted binary value, or predicted log likelihood) associated with one or more of the inferences. Continuing with the above example where the inference made by the inference engine 126 indicates that a given crop in the first row $R_1$ of the NW corn field from FIG. 2 is wilting, the predicted label can be a "wilting" label that may be associated with a predicted probability of 0.8 that is indicative of a confidence that the given crop is wilting (e.g., based on the predicted probability of 0.8 satisfying a wilting threshold). Further assume the user input indicates that the given crop is, in fact, not wilting. In this example, the ground truth label can be a "wilting" label that may be associated with a predicted probability of 0.0 that is indicative of a confidence that the given crop is wilting. The update can be generated based on comparing the predicted value of 0.8 and the ground truth value of 0.0, and utilized to update the ML model(s) utilized to make the inference.

Also, for example, in implementations where the human operator does not provide any user input to validate one or more of the inferences and an additional inference is made, an additional predicted label (or additional predicted value, such as an additional predicted probability, an additional binary value, or an additional log likelihood) can be generated based on the additional inference. Continuing with the above example where the inference made by the inference engine 126 indicates that a given crop in the first row $R_1$ of the NW corn field from FIG. 2 is wilting, the predicted label can be a "wilting" label that may be associated with a predicted probability of 0.8 that is indicative of a confidence that the given crop is wilting (e.g., based on the predicted probability of 0.8 satisfying a wilting threshold). Further assume the inference engine 126 indicates that the given crop in the first row $R_1$ of the NW corn field from FIG. 2 is wilting, the additional predicted label can be a "wilting" label that may be associated with an additional predicted probability of 0.4 that is indicative of a confidence that the given crop is not wilting (e.g., based on the additional predicted probability of 0.4 not satisfying the wilting threshold). In this example, the update can be generated based on comparing the predicted value of 0.8 and the additional predicted value of 0.4, and utilized to update the ML model(s) utilized to make the inference.

Figure 5A:
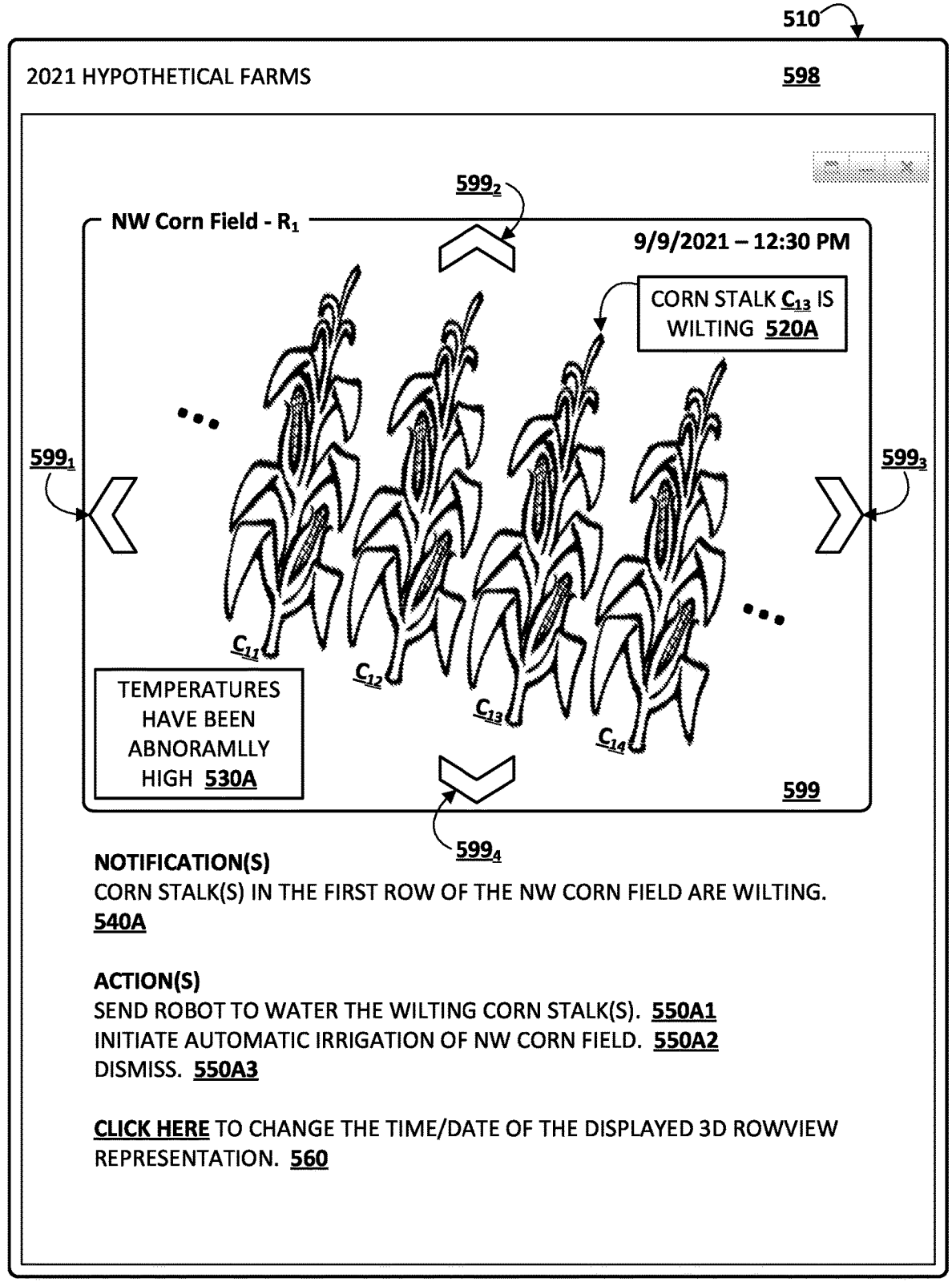
FIG. 5A, FIG. 5B, and FIG. 5C depict various non-limiting examples of a graphical user interface associated with a rowview system, in accordance with various implementations.
Figure 5B:
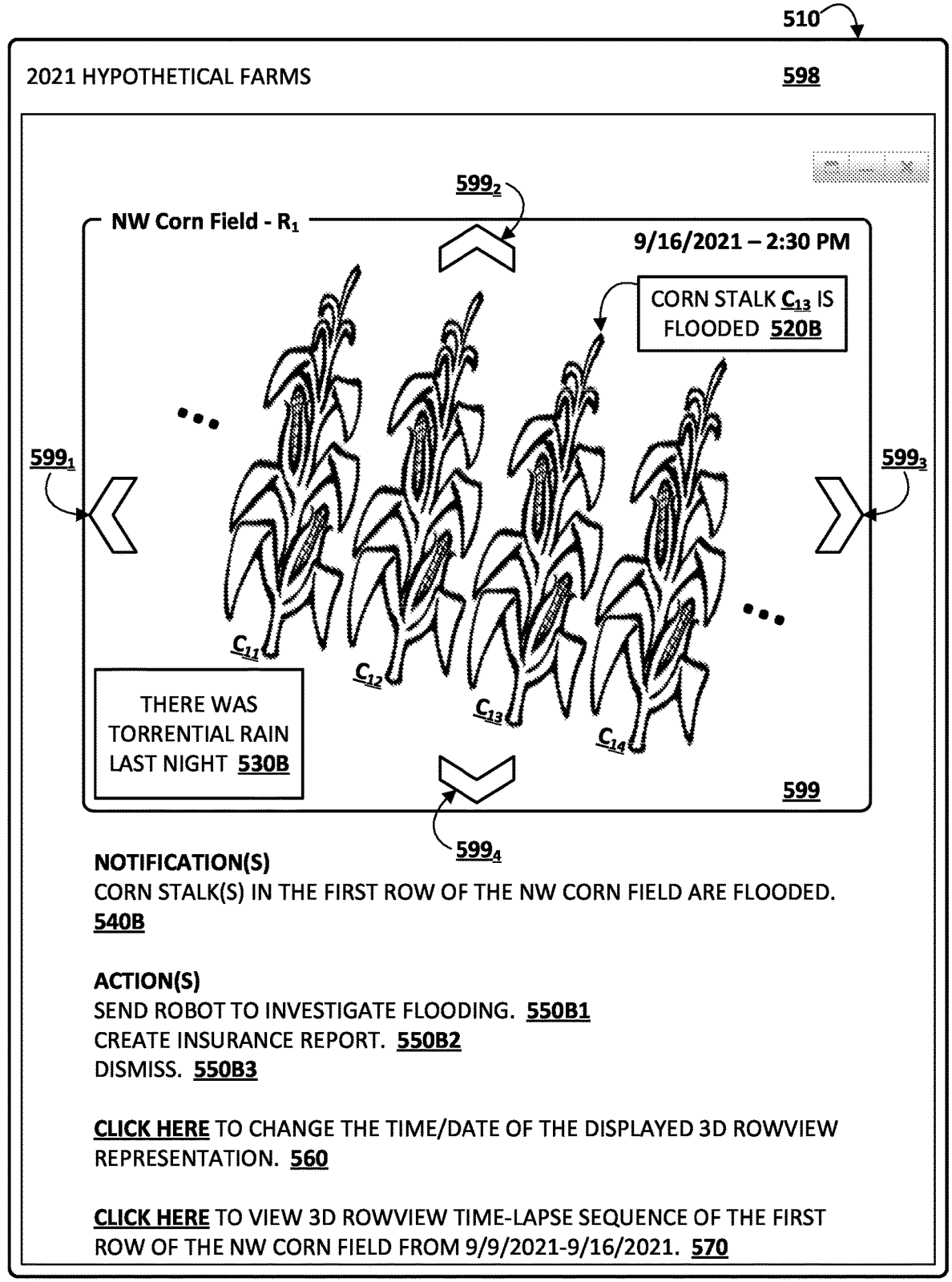
Figure 5C:
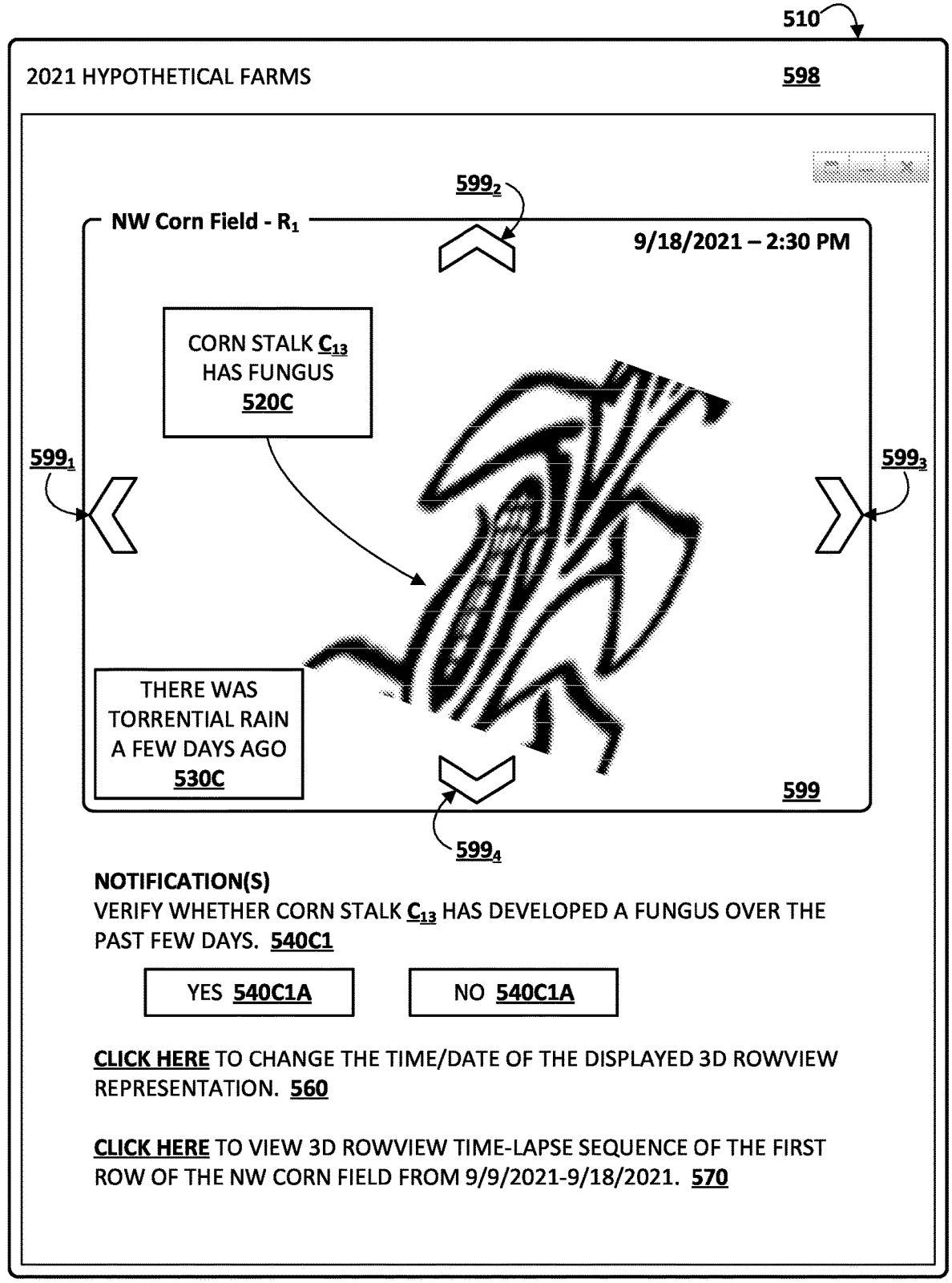

The rowview annotation engine 128 can utilize one or more of the inferences and/or the non-vision data to annotate the 3D rowview representations described herein (e.g., as described in more detail with respect to FIGS. 5A-5C). In some implementations, the rowview annotation engine 128 can annotate the 3D rowview representations as they are generated. In additional or alternative implementations, the rowview annotation engine 128 can access the 3D rowview representations stored in one or more of the databases (e.g., the rowview representation(s) database 124A) after they are generated. In some implementations, the annotations described herein are can be associated with certain aspects of the 3D rowview representations, and the human operator can interact with the certain aspects to access the annotations. For instance, one or more crops of a row associated with the 3D rowview representation may be selectable, such that the human operator can direct user input to a given crop to cause an annotation that includes an indication of one or more inferences made with respect to the given crop to be provided for visual presentation to the human operator. Also, for instance, the human operator can direct user input to one or more graphical elements to cause an annotation that includes an indication of non-vision data to be toggled on or off. Although particular interactions are described above, it should be understood that is for the sake of example and is not meant to be limiting.

Figure 3:
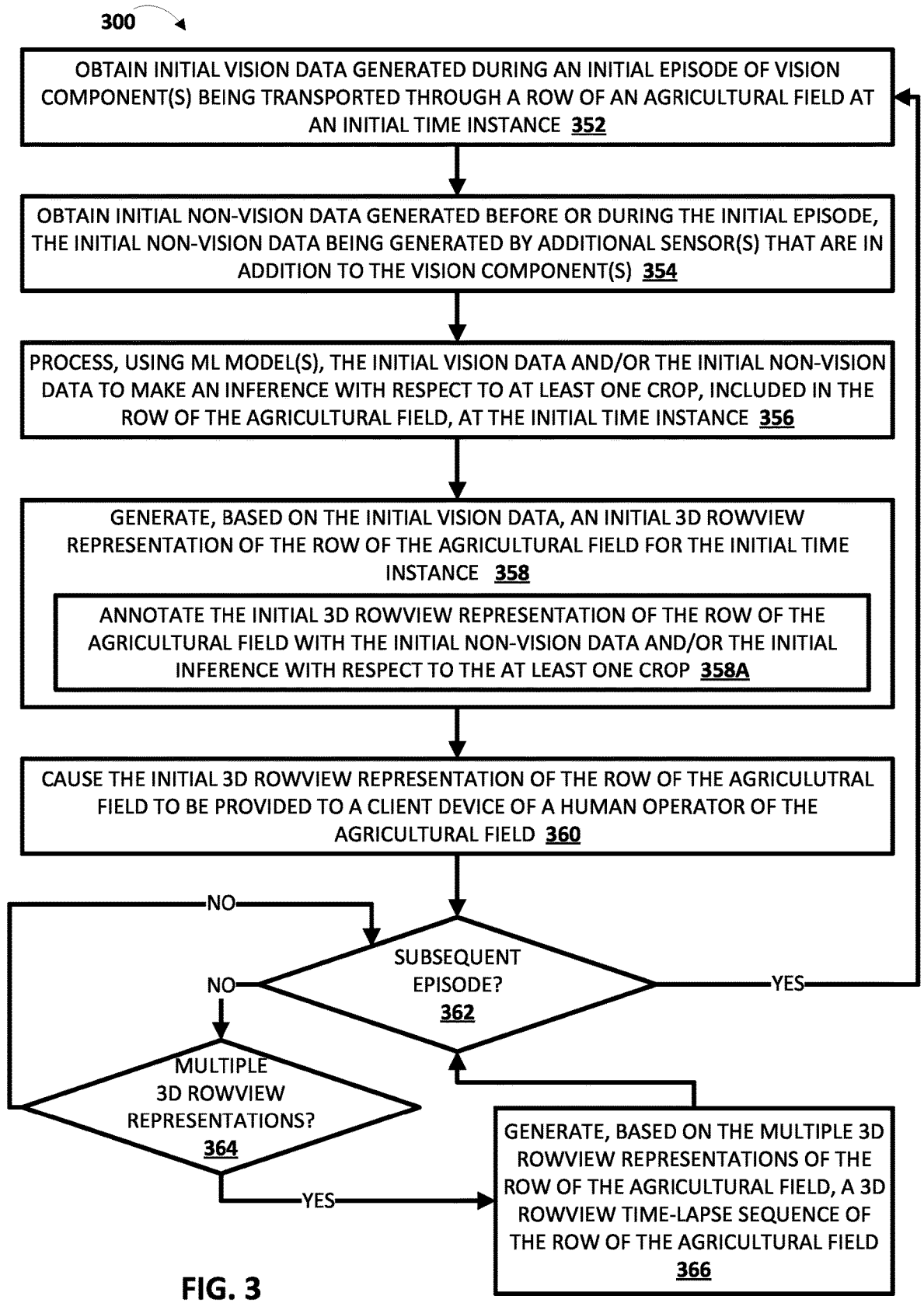
FIG. 3 depicts a flowchart illustrating an example method of generating three-dimensional rowview representation(s) of row(s) of an agricultural field at time instance(s), in accordance with various implementations.

Turning now to FIG. 3, a flowchart illustrating an example method 300 of generating three-dimensional rowview representation(s) of row(s) of an agricultural field at time instance(s) is depicted. For convenience, the operations of the method 300 are described with reference to a system that performs the operations. This system of the method 300 includes at least one processor, at least one memory, and/or other component(s) of computing device(s) (e.g., client device(s) $110_{1-N}$ of FIG. 1, robot(s) $130_{1-M}$ of FIG. 1, rowview system 120 of FIG. 1, robot 630 of FIG. 6, computing device 710 of FIG. 7, server(s), and/or other computing devices). Moreover, while operations of the method 300 are shown in a particular order, this is not meant to be limiting. One or more operations may be reordered, omitted, and/or added.

At block 352, the system obtains initial vision data generated during an initial episode of one or more vision components being transported through a row of an agricultural field at an initial time instance. In some implementations, the one or more vision components can be mechanically coupled to a robot that is traversing along the row of the agricultural field at the initial time instance and during the initial episode. In additional or alternative implementations, the one or more vision components can be integral to a module that is mechanically coupled to a piece of farm machinery that is traversing along the row of the agricultural field at the initial time instance and during the initial episode.

At block 354, the system obtains initial non-vision data generated before or during the initial episode, the initial non-vision data being generated by one or more additional sensors that are in addition to the one or more vision components. In some implementations, the additional sensors may be integral to the robot and/or the piece of farm machinery that is utilized to transport the one or more vision components along the row of the agricultural field at the initial time instance, whereas in additional or alternative implementations, the additional sensors may be external to the robot and/or the piece of farm machinery that is utilized to transport the one or more vision components along the row of the agricultural field at the initial time instance. In some implementations, the non-vision data can include non-vision data generated by the one or more additional sensors prior to the initial time instance (e.g., sensor data that is indicative of a weather pattern prior to the initial episode, such as 5" of rain yesterday or a 10-day drought) and/or non-vision data generated by the one or more additional sensors during the initial time instance (e.g., sensor data that is indicative of a weather pattern during the initial episode, such as currently raining or current wind conditions).

At block 356, the system processes, using one or more machine learning ("ML") models, the initial vision data and/or the initial non-vision data to make an inference with respect to at least one crop, included in the row of the agricultural field, at the initial time instance. The system can make the inference with respect to the using one or more ML models (e.g., as described above with respect to the inference engine 126 of FIG. 1). In some implementations, the inference can be made as the vision components are transported along the row as the initial vision data is generated by the one or more vision components (e.g., in a real-time manner (or near real-time manner)), whereas in additional or alternative implementations, the inference can be made subsequent to the vision components being transported along the row (e.g., in an asynchronous manner).

At block 358, the system generates, based on the initial vision data, an initial three-dimensional ("3D") rowview representation of the row of the agricultural field for the initial time instance. The system can generate the initial 3D rowview representation of the row of the agricultural field using one or more 3D reconstruction techniques (e.g., as described above with respect to the rowview representation engine 124 of FIG. 1). In some implementations, the initial 3D rowview representation can be generated as the vision components are transported along the row as the initial vision data is generated by the one or more vision components (e.g., in a real-time manner (or near real-time manner)) to enable a human operator of the agricultural field to view the initial 3D rowview representation as the one or more vision components are being transported along the row or subsequent to the one or more vision components being transported along the row, whereas in additional or alternative implementations, the initial 3D rowview representation can be generated subsequent to the vision components being transported along the row (e.g., in an asynchronous manner) to enable the human operator of the agricultural field to view the initial 3D rowview representation subsequent to the one or more vision components being transported along the row.

In some implementations, at sub-block 358A and in generating the initial 3D rowview representation of the row of the agricultural field for the initial time instance, the system annotates the initial 3D rowview representation of the row of the agricultural field for the initial time instance. The system can annotate the initial 3D rowview representation with indications of any inferences made with respect to the at least one crop, the row, and/or the agricultural field (e.g., an indication of the inference made with respect to the at least one crop at block 356), and/or any non-vision data generated before or during the initial episode (e.g., an indication of the non-vision data obtained at block 354). Annotated 3D rowview representations are described in greater detail herein (e.g., with respect to FIGS. 5A-5C).

At block 360, the system causes the initial 3D rowview representation of the row of the agricultural field to be provided to a client device of a human operator of the agricultural field. For example, the initial 3D rowview representation of the row of the agricultural field can be provided to one or more of the client devices $110_{1-N}$ of FIG. 1 to enable the human operator to virtually traverse through the row of the agricultural field at the initial time instance as if the human operator were physically traversing along the row of the agricultural field at the initial time instance. Further, by annotating the initial 3D rowview representation, the human operator also has access to information that may not be readily apparent to the human operator if he/she were to physically traverse along the row of the agricultural field at the initial time instance.

At block 362, the system determines whether there is a subsequent episode of the one or more vision components being transported through the row of the agricultural field at a subsequent time instance. Notably, the system can utilize a mapping of the agricultural field (e.g., a local mapping or a global mapping described with respect to the mapping engine 122 of FIG. 1) to determine whether there is a subsequent episode of the one or more vision components being transported through the row of the agricultural field at a subsequent time instance. If, at an iteration of block 362, the system determines that there is a subsequent episode of the one or more vision components being transported through the row of the agricultural field at a subsequent time instance, then the system returns to block 352 to perform a subsequent iteration of the operations of blocks 352-360, but with respect to subsequent vision data generated by the one or more vision components at the subsequent time instance to generate a subsequent 3D rowview representation of the row of the agricultural field. If, at an iteration of block 362, the system determines that there is not yet a subsequent episode of the one or more vision components being transported through the row of the agricultural field at a subsequent time instance, then the system proceeds to block 364.

At block 364, the system determines whether there are multiple 3D rowview representations associated with the row of the agricultural field. The system can determine whether there are multiple 3D rowview representations associated with the row of the agricultural field by querying one or more databases based on a location of the row (e.g., the rowview representation(s) database 124A). If, at an iteration of block 364, the system determines there are not multiple 3D rowview representations associated with the row of the agricultural field, then the system returns to block 362 to perform a subsequent iteration of the operations of block 362. If, at an iteration of block 364, the system determines there are multiple 3D rowview representations associated with the row of the agricultural field, then the system proceeds to block 366.

At block 366, the system generates, based on the multiple 3D rowview representations of the row of the agricultural field, a 3D rowview representation time-lapse sequence of the row of the agricultural field. The system can cause the 3D rowview representation time-lapse sequence of the row of the agricultural field to be provided to the client device of the human operator of the agricultural field. The system can utilize one or more interpolation or extrapolation techniques in generating the 3D rowview representation time-lapse sequence of the row, and inject one or more animations into the 3D rowview representation time-lapse sequence of the row. The animations can indicate how any annotations associated with inferences made have evolved over multiple disparate time instances (e.g., with respect to the same crop, with respect to the same row, etc.), how any annotations associated with non-vision data have evolved over the multiple disparate time instances, various graphics (e.g., rain, sunshine, clouds, etc.). Notably, as additional 3D rowview representations of the row of the agricultural field are generated, the 3D rowview representation time-lapse sequence of the row of the agricultural field can be updated based on the additional 3D rowview representations. The system returns to block 362 to perform another subsequent iteration of the operations of block 362.

Although the method 300 of FIG. 3 is described with respect to only a single row of the agricultural field, it should be understood that is for the sake of example and is not meant to be limiting. For example, an iteration of the method 300 of FIG. 3 can be performed for each of the rows of the agricultural field in sequence, such as when a given robot and/or a given piece of farm machinery transports one or more of the vision components along each row of the agricultural field in a sequential manner, and/or in parallel, such as when multiple robots and/or multiple pieces of farm machinery transport one or more of the vision components along one or more rows of the agricultural field in a parallel manner (e.g., along the same row or along multiple rows). Moreover, although the method 300 of FIG. 3 is not described above with respect to validating any inferences made using the ML model(s) it should be understood that is also for the sake of example and is not meant to be limiting. For instance, one or more of the operations described below with respect to the method 400 of FIG. 4 can be incorporated into the method 300 of FIG. 3.

Figure 4:
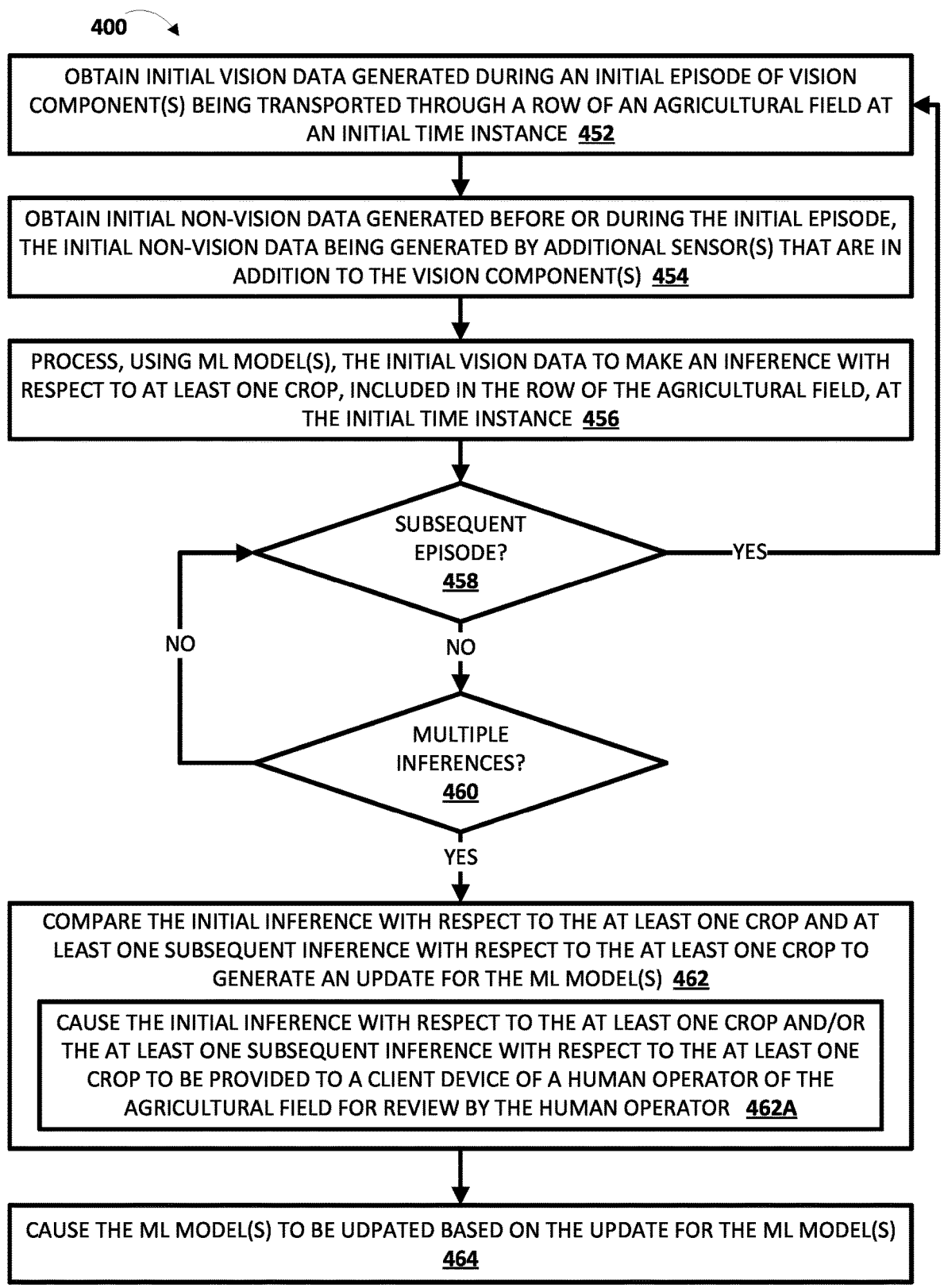
FIG. 4 depicts a flowchart illustrating an example method of tracking inference(s) across time instance(s) and causing machine learning model(s) to be updated based on the inference(s), in accordance with various implementations.

Turning now to FIG. 4, a flowchart illustrating an example method 400 of tracking inference(s) across time instance(s) and causing machine learning model(s) to be updated based on the inference(s) is depicted. For convenience, the operations of the method 400 are described with reference to a system that performs the operations. This system of the method 400 includes at least one processor, at least one memory, and/or other component(s) of computing device(s)

Figure 6:
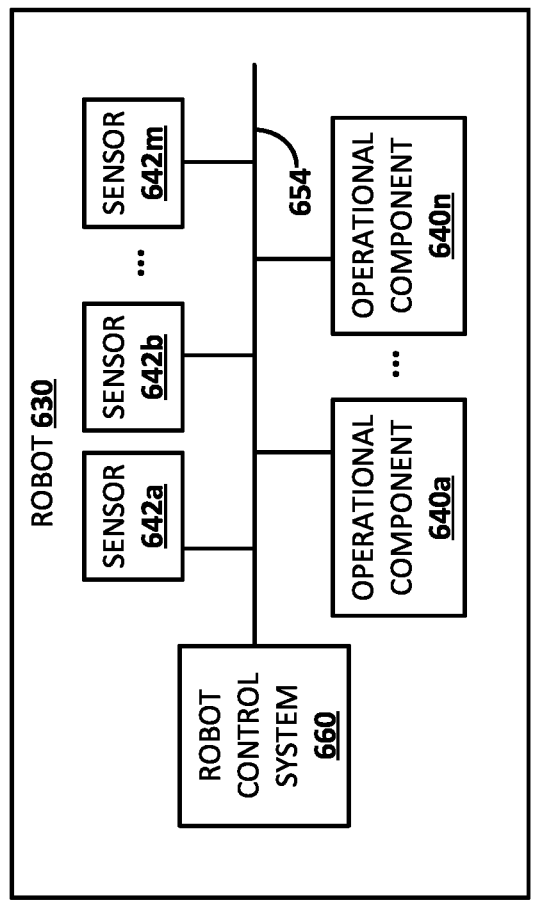
FIG. 6 depicts an example architecture of a robot, in accordance with various implementations.
Figure 7:
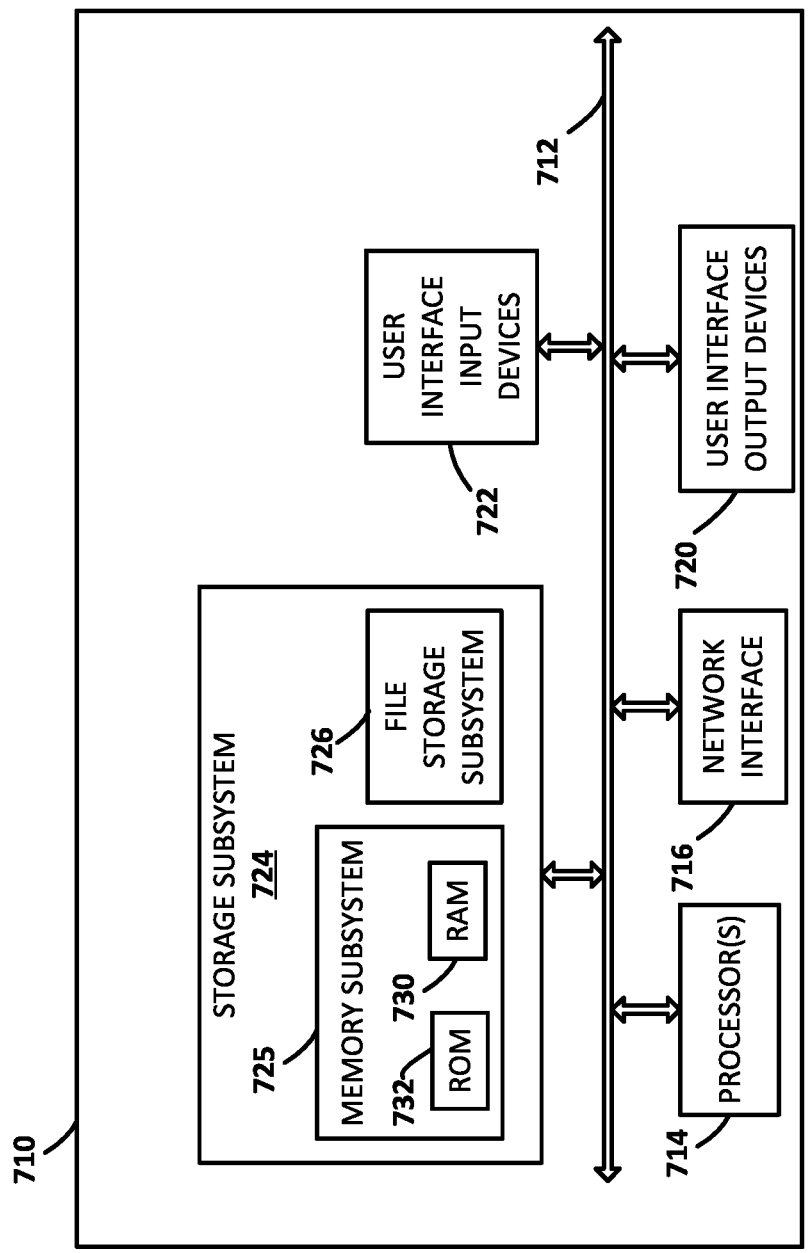
FIG. 7 depicts an example architecture of a computing device, in accordance with various implementations.

(e.g., client device(s) $110_{1-N}$ of FIG. 1, robot(s) $130_{1-M}$ of FIG. 1, rowview system 120 of FIG. 1, robot 630 of FIG. 6, computing device 710 of FIG. 7, server(s), and/or other computing devices). Moreover, while operations of the method 400 are shown in a particular order, this is not meant to be limiting. One or more operations may be reordered, omitted, and/or added.

At block 452, the system obtains initial vision data generated during an initial episode of one or more vision components being transported through a row of an agricultural field at an initial time instance. At block 454, the system obtains initial non-vision data generated before or during the initial episode, the initial non-vision data being generated by one or more additional sensors that are in addition to the one or more vision components. At block 456, the system processes, using one or more machine learning ("ML") models, the initial vision data and/or the initial non-vision data to make an inference with respect to at least one crop, included in the row of the agricultural field, at the initial time instance. The operations of blocks 452-456 can be performed in the same or similar manner described above with respect to blocks 352-356 of FIG. 3, respectively.

At block 458, the system determines whether there is a subsequent episode of the one or more vision components being transported through the row of the agricultural field at a subsequent time instance. Notably, the system can utilize a mapping of the agricultural field (e.g., a local mapping or a global mapping described with respect to the mapping engine 122 of FIG. 1) to determine whether there is a subsequent episode of the one or more vision components being transported through the row of the agricultural field at a subsequent time instance. If, at an iteration of block 458, the system determines that there is a subsequent episode of the one or more vision components being transported through the row of the agricultural field at a subsequent time instance, then the system returns to block 452 to perform a subsequent iteration of the operations of blocks 452-456, but with respect to subsequent vision data generated by the one or more vision components at the subsequent time instance to generate a subsequent inference with respect to the at least one crop. If, at an iteration of block 458, the system determines that there is not yet a subsequent episode of the one or more vision components being transported through the row of the agricultural field at a subsequent time instance, then the system proceeds to block 460.

At block 460, the system determines whether there are multiple inferences with respect to the at least one crop. The system can determine whether there are multiple inferences with respect to the at least one crop by querying one or more databases based on a location of the row (e.g., the rowview representation(s) database 124A). If, at an iteration of block 460, the system determines there are no inferences with respect to the at least one crop, then the system returns to block 458 to perform a subsequent iteration of the operations of block 458. Put another way, the system can perform multiple iterations of the operations of blocks 458 and 460 until there are multiple episodes and/or multiple inferences. If, at an iteration of block 460, the system determines there are multiple inferences with respect to the at least one crop, then the system proceeds to block 462.

At block 462, the system compares the initial inference with respect to the at least one crop and at least one subsequent inference (made during a subsequent episode that is subsequent to the initial episode) with respect to the at least one crop to generate an update for one or more of the ML models. For example, the system can compare a predicted label (or predicted value) associated with the initial inference to a subsequent predicted label (or subsequent predicted value) associated with the subsequent inference to generate the update (e.g., as described with respect to the inference validation engine 127 of FIG. 1). In some implementations, at sub-block 462A, the system causes the initial inference with respect to the at least one crop and/or the at least one subsequent inference with respect to the at least one crop to be provided to a client device of a human operator of the agricultural field for review by the human operator. In these implementations, the human operator can direct user input to the client device (e.g., touch input or spoken input) to validate or invalidate the initial inference with respect to the at least one crop and/or the at least one subsequent inference with respect to the at least one crop (e.g., as described with respect to the inference validation engine 127 of FIG. 1). At block 464, the system causes one or more of the ML models to be updated based on the update for one or more of the ML models. For example, the system can cause the update for one or more of the ML models to be backpropagated across one or more of the ML models, thereby updating weights of one or more of the ML models.

Although the method 400 of FIG. 4 is described with respect to inferences made with respect to the at least one crop, it should be understood that is for the sake of example and is not meant to be limiting. For example, iterations of the method 400 of FIG. 4 can be utilized to validate any inferences made with respect to any crops, rows of crops, or an agricultural field that includes the rows of crops. Moreover, although the method 400 of FIG. 4 is not described above with respect to validating any inferences made using the ML model(s) it should be understood that is also for the sake of example and is not meant to be limiting. For instance, one or more of the operations described above with respect to the method 300 of FIG. 3 can be incorporated into the method 400 of FIG. 4, and, in implementations where the inference(s) are provided for review by the human operator, that the 3D rowview representations enable the human operator to validate or invalidate the inference(s).

Turning now to FIGS. 5A, 5B, and 5C, various non-limiting examples of a graphical user interface ("GUI") 598 associated with a rowview system (e.g., the rowview system 120 of FIG. 1 provided by the user interface engine 121 of FIG. 1) are depicted at a client device 510. In some implementations, the GUI 598 may be provided as a website that is accessible via a web browser of the client device 510. In additional or alternative implementations, the GUI 598 may be provided as part of a software application that operates at the client device 510 (e.g., smart phone, tablet, etc.) using data received/obtained from the rowview system 120 of FIG. 1. Although the client device 510 is depicted in FIGS. 5A-5C as a tablet, it should be understood that is for the sake of example and is not meant to be limiting. For example, in instances where the client device 510 is a head-mounted display ("HMD") (e.g., client device 110N as shown in FIG. 1), the client device 510 may operate a VR or AR application that receives/obtains data from the rowview system 120 of FIG. 1 and provides a human operator with an immersive experience. For the sake of example throughout FIGS. 5A, 5B, and 5C, assume that the local mapping depicted in FIG. 2 corresponds to a previously generated local mapping that is associated with a hypothetical agricultural field—2020 1Hypothetical Farms (e.g., as indicated by the GUI 598). Accordingly, the agricultural field of the previously generated local mapping includes at least a first agricultural plot of NW corn field having corresponding rows $R_1$-$R_N$, a second agricultural plot of NE soybean field having corresponding rows $R_1$-$R_N$, and a third agricultural plot of S wheat field having corresponding rows $R_1$-$R_N$.

In some implementations, the GUI 598 may be operable by a human operator of the agricultural field to interact with various 3D rowview representations. For example, and referring specifically to FIG. 5A, assume that an initial 3D rowview representation for the first row $R_1$ of the NW corn field is generated based on the robot 130$_M$ (or piece of farm machinery) transporting the one or more vision components along the first row $R_1$ of the NW corn field during an initial episode at an initial time instance as depicted in FIG. 2. In this example, a portion 599 of the GUI 598 can provide the initial 3D rowview representation for the first row $R_1$ of the NW corn field for visual presentation to a human operator associated with the client device 510, and along with an indication of the initial time instance (e.g., Sep. 9, 2021 at approximately 12:30 PM as indicated by the portion 599 of the GUI 598). Notably, the portion 599 of the GUI 598 may only depict a portion of the first row $R_1$ of the NW corn field since the one or more vision components may only capture a portion of the first row $R_1$ of the NW corn field at any given time instance, such as an eleventh crop $C_{11}$, a twelfth crop $C_{12}$, a thirteenth crop $C_{13}$, and a fourteenth crop $C_{14}$, although the first row $R_1$ of the NW corn field may include additional crops (e.g., as indicated by the ellipses included in the portion 599 of the GUI 598). Nonetheless, various GUI elements may be provided to enable the human operator associated with the client device 510 to virtually traverse along the first row $R_1$ of the NW corn field via the initial 3D rowview representation for the initial time instance.

For example, a first GUI element 599$_1$ may enable the human operator to virtually traverse along the first row $R_1$ of the NW corn field from the eleventh crop $C_{11}$ and towards a tenth crop (not depicted), a ninth crop (not depicted), an eighth crop (not depicted), and so on. Further, a second GUI element 599$_2$ may enable the human operator to virtually traverse along the first row $R_1$ of the NW corn field from the fourteenth crop $C_{14}$ and towards a fifteenth crop (not depicted), a sixteenth crop (not depicted), a seventeenth crop (not depicted), and so on. Moreover, a third GUI element 599$_3$ may enable the human operator to pan up to view certain aspects of the crops displayed in the portion 599 of the GUI 598, and a fourth GUI element 599$_4$ may enable the human operator to pan down to view other certain aspects of the crops displayed in the portion 599 of the GUI 598. Additionally, or alternatively, the third GUI element 599$_3$ may enable the human operator to cause a 3D rowview representation of a next row to be displayed in the portion 599 of the GUI 598 (e.g., the second row $R_2$ of the NW corn field), and the third GUI element 599$_4$ may enable the human operator to cause a 3D rowview representation of a previous row to be displayed in the portion 599 of the GUI 598 (e.g., back to the first row $R_1$ of the NW corn field if the human operator directs input to the third GUI element 599$_3$ to cause the 3D rowview representation of the second row $R_2$ of the NW corn field to be displayed). Although GUI elements are depicted and particular operations with respect to the GUI elements are described, it should be understood that is for the sake of example and is not meant to be limiting, and that any other GUI elements or techniques may be provided that enable the human operator to virtually traverse along the first row $R_1$ of the NW corn field (and any other rows for which 3D rowview representations are generated), such as graphical elements that enable the human operator to zoom-in or zoom-out on certain aspects of the crops or the first row $R_1$ of the NW corn field.

The initial 3D rowview representation of the first row $R_1$ of the NW corn field depicted in FIG. 5A includes various annotations. For example, a first annotation 520A depicted in the portion 599 of the GUI 598 includes an indication of an inference made with respect to the thirteenth crop $C_{13}$ and based on processing vision data generated by the one or more vision components (and optionally non-vision data generated by one or more additional sensors) that is utilized in generating the initial 3D rowview representation of the first row $R_1$ of the NW corn field. Notably, the first annotation 520A indicates that the thirteenth crop $C_{13}$ is wilting. In this example, the first annotation 520A may be provided for presentation in response to detecting user input from the human operator that is directed to the thirteenth crop $C_{13}$, or may be persistent in the portion 599 of the GUI 598. Although only an annotation including an inference made with respect to the thirteenth crop $C_{13}$ is depicted in FIG. 5A, it should be understood that is for the sake of clarity and is not meant to be limiting. For instance, the portion 568 of the GUI 598 may additionally, or alternatively, include additional annotations associated with inferences made with respect to other crops (e.g., the eleventh crop $C_{11}$, the twelfth crop $C_{12}$, the fourteenth crop $C_{14}$, etc.), the first row $R_1$ of the NW corn field (e.g., soil conditions, undergrowth conditions, etc.), and/or the NW corn field itself (e.g., predicted yield across the entirety of the NW corn field, etc.). Also, for example, a second annotation 530A depicted in the portion 599 of the GUI 598 includes an indication of a non-vision data generated before or during the initial episode at the initial time instance that is associated with the initial 3D rowview representation of the first row $R_1$ of the NW corn field depicted in FIG. 5A. Notably, the second annotation 530A indicates that temperatures have been abnormally high, which may provide a natural language explanation helping to inform the human operator as to why the thirteenth crop $C_{13}$ is wilting (e.g., as indicated by the first annotation 520A). In this example, the second annotation 530A may be provided for presentation in response to detecting user input from the human operator that is directed to a selectable element associated with providing the non-vision data (not depicted), or may be persistent in the portion 599 of the GUI 598.

In some implementations, information associated with the initial 3D rowview representation of the first row $R_1$ of the NW corn field depicted in FIG. 5A can be provided. For example, based on the inference made with respect to the thirteenth crop $C_{13}$ (and/or any other inferences made based on processing the vision data utilized in generating the initial 3D rowview representation), one or more notifications can be generated and provided for presentation to the human operator. For instance, notification 540A depicted in FIG. 5A includes an indication that one or more corn stalks in the first row $R_1$ of the NW corn field are wilting based on the inference made with respect to at least the thirteenth crop $C_{13}$. Also, for example, based on the inference made with respect to the thirteenth crop $C_{13}$ (and/or any other inferences made based on processing the vision data utilized in generating the initial 3D rowview representation), one or more recommended actions can be provided for presentation to the human operator, and that may be selectable to cause a corresponding one of the recommended actions to be performed. For instance, a first recommended action 550A1 can include a recommended action of sending a robot to water the one or more wilting corn stalks in the NW corn field (e.g., which may be advantageous if only one or a few corn stalks are wilting to conserve water), a second recommended action 550A2 can include a recommended action of initiating automatic irrigation of the NW corn field (e.g., which may be advantageous if may corn stalks are wilting to address the wilting issue), and a dismiss action 550A3 to cause the notification and/or the one or more recommended actions to be dismissed.

In some implementations, the human operator can also be provided with an option 560 to specify a time and/or date of the displayed 3D rowview representation. For example, assume the human operator directs input towards the option 560 to select a subsequent 3D rowview representation of the first row $R_1$ of the NW corn field at a subsequent time instance. In this example, the portion 599 of the GUI 598 may transition from the initial 3D rowview representation of the first row $R_1$ of the NW corn field depicted in FIG. 5A to the subsequent 3D rowview representation of the first row $R_1$ of the NW corn field depicted in FIG. 5B. Although the option 560 is described with respect to enabling the human operator to specify a time and/or date of the displayed 3D rowview representation, it should be understood that is for the sake of example and is not meant to be limiting, and that the option 560 (or another option) may be provided to enable the human operator to specify a different row as well.

For example, and referring specifically to FIG. 5B, assume that the subsequent 3D rowview representation for the first row $R_1$ of the NW corn field is generated based on the robot $130_M$ (or the piece of farm machinery) transporting the one or more vision components along the first row $R_1$ of the NW corn field during a subsequent episode at a subsequent time instance that is subsequent to the initial time instance. In this example, the portion 599 of the GUI 598 can provide the subsequent 3D rowview representation for the first row $R_1$ of the NW corn field for visual presentation to the human operator associated with the client device 510, and along with an indication of the subsequent time instance (e.g., Sep. 16, 2021 at approximately 2:30 PM as indicated by the portion 599 of the GUI 598), and optionally in response to the human operator specifying the subsequent time instance via the option 560 of FIG. 5A (or a next time instance for which a 3D rowview representation for the first row $R_1$ of the NW corn field was generated). Similar to the initial 3D rowview representation depicted in FIG. 5A, the portion 599 of the GUI 598 may only depict a portion of the first row $R_1$ of the NW corn field in the subsequent 3D rowview representation depicted in FIG. 5A since the one or more vision components may only capture a portion of the first row $R_1$ of the NW corn field at any given time instance.

Similar to the initial 3D rowview representation depicted in FIG. 5A, the subsequent 3D rowview representation of the first row $R_1$ of the NW corn field depicted in FIG. 5B includes various annotations. However, the annotations depicted with respect to the subsequent 3D rowview representation of the first row $R_1$ of the NW corn field depicted in FIG. 5B may be generated based on vision data generated during the subsequent episode and/or non-vision data generated before or during the subsequent time instance. For example, a first annotation 520B depicted in the portion 599 of the GUI 598 includes another indication of an inference made with respect to the thirteenth crop $C_{13}$ and based on processing vision data generated by the one or more vision components (and optionally non-vision data generated by one or more additional sensors) that is utilized in generating the subsequent 3D rowview representation of the first row $R_1$ of the NW corn field. Notably, the first annotation 520B indicates that the thirteenth crop $C_{13}$ is flooded. Also, for example, a second annotation 530B depicted in the portion 599 of the GUI 598 includes an indication of a non-vision data generated before or during the subsequent episode at the subsequent time instance that is associated with the subsequent 3D rowview representation of the first row $R_1$ of the NW corn field depicted in FIG. 5B. Notably, the second annotation 530B indicates that there was torrential rain the night before, which may provide a natural language explanation helping to inform the human operator as to why the thirteenth crop $C_{13}$ is flooded (e.g., as indicated by the first annotation 520B).

In some implementations, and similar to the initial 3D rowview representation depicted in FIG. 5A, information associated with the subsequent 3D rowview representation of the first row $R_1$ of the NW corn field depicted in FIG. 5B can be provided. For example, based on the inference made with respect to the thirteenth crop $C_{13}$ (and/or any other inferences made based on processing the vision data utilized in generating the subsequent 3D rowview representation), one or more notifications can be generated and provided for presentation to the human operator. For instance, notification 540B depicted in FIG. 5B includes an indication that one or more corn stalks in the first row $R_1$ of the NW corn field are flooded based on the inference made with respect to at least the thirteenth crop $C_{13}$. Also, for example, based on the inference made with respect to the thirteenth crop $C_{13}$ (and/or any other inferences made based on processing the vision data utilized in generating the subsequent 3D rowview representation), one or more recommended actions can be provided for presentation to the human operator, and that may be selectable to cause a corresponding one of the recommended actions to be performed. For instance, a first recommended action 550B1 can include a recommended action of sending a robot to investigate the flooding (e.g., which may be advantageous to determine whether the flooding has devastated the crops), a second recommended action 550B2 can include a recommended action of creating an insurance report (e.g., which may be advantageous if the corn stalks are, in fact, devastated based on the flooding), and a dismiss action 550B3 to cause the notifications and/or the one or more recommended actions to be dismissed.

In some implementations, and similar to the initial 3D rowview representation depicted in FIG. 5A, the human operator can also be provided with an option 560 to specify a time and/or date of the displayed 3D rowview representation. In some implementations, the human operator can additionally or alternatively be provided with an additional option 570 to cause a 3D rowview time-lapse sequence of the first row $R_1$ of the NW corn field to be provided for playback at the portion 599 of the GUI 598. The 3D rowview time-lapse sequence of the first row $R_1$ of the NW corn field can include, for example, a rowview animation of the first row $R_1$ of the NW corn field across multiple disparate time instances (e.g., across the initial time instance corresponding to approximately Sep. 9, 2021 at 12:30 PM to the subsequent time instance corresponding to approximately Sep. 16, 2021 at 2:30 PM). For example, the rowview animation can illustrate how the first annotation 520A of FIG. 5A evolves to the first annotation of 520B of FIG. 5B (and including any intervening annotations related to inferences), and how the second annotation 530A of FIG. 5A evolves to the second annotation of 530B of FIG. 5B (and including any intervening annotations related to non-vision data). Moreover, other information can be interpolated and/or extrapolated based on at least the initial 3D rowview representation of FIG. 5A and the subsequent 3D rowview representation of FIG. 5B. For example, the rowview animation can initially include graphics of the sun or sun rays beaming down on the crops to indicate that crops of the first row $R_1$ of the NW corn field, but transition to animated rain to account for the torrential rain. Further, the rowview animation can animate sunrises, sunsets, stars, and/or any other graphics across the multiple disparate time instances. Although particular animations and graphics are described above with respect to the 3D rowview time-lapse sequence of the first row $R_1$ of the NW corn field, it should be understood those are provided for the sake of example and are not meant to be limiting. For instance, animated growth of a fungal infection, animated undergrowth of weeds, and/or any other animation based on the inferences and/or the non-vision data can be included in the rowview animation.

Referring specifically to FIG. 5C, assume that a further subsequent 3D rowview representation for the first row $R_1$ of the NW corn field is generated based on the robot $130_M$ (or the piece of farm machinery) transporting the one or more vision components along the first row $R_1$ of the NW corn field during a further subsequent episode at a further subsequent time instance that is subsequent to the initial time instance and the subsequent time instance. In this example, the portion 599 of the GUI 598 can provide the subsequent 3D rowview representation for the first row $R_1$ of the NW corn field for visual presentation to the human operator associated with the client device 510, and along with an indication of the further subsequent time instance (e.g., Sep. 18, 2021 at approximately 2:30 PM as indicated by the portion 599 of the GUI 598), and optionally in response to the human operator specifying the subsequent time instance via the option 560 of FIG. 5A or 5B. Similar to the initial 3D rowview representation depicted in FIGS. 5A and 5B, the portion 599 of the GUI 598 may only depict a portion of the first row $R_1$ of the NW corn field in the subsequent 3D rowview representation depicted in FIG. 5A since the one or more vision components may only capture a portion of the first row $R_1$ of the NW corn field at any given time instance. Notably, the portion 599 of the GUI 598 depicts a zoomed in view of the thirteenth corn stalk $C_{13}$.

Similar to the initial 3D rowview representation depicted in FIG. 5A and the subsequent 3D rowview representation depicted in FIG. 5B, the further subsequent 3D rowview representation of the first row $R_1$ of the NW corn field depicted in FIG. 5C includes various annotations. However, the annotations depicted with respect to the subsequent 3D rowview representation of the first row $R_1$ of the NW corn field depicted in FIG. 5C may be generated based on vision data generated during the further subsequent episode and/or non-vision data generated before or during the further subsequent time instance. For example, a first annotation 520C depicted in the portion 599 of the GUI 598 includes another indication of an inference made with respect to the thirteenth crop $C_{13}$ and based on processing vision data generated by the one or more vision components (and optionally non-vision data generated by one or more additional sensors) that is utilized in generating the further subsequent 3D rowview representation of the first row $R_1$ of the NW corn field. Notably, the first annotation 520C indicates that the thirteenth crop $C_{13}$ has been infected with a fungus. Also, for example, a second annotation 530C depicted in the portion 599 of the GUI 598 includes an indication of a non-vision data generated before or during the further subsequent episode at the further subsequent time instance that is associated with the further subsequent 3D rowview representation of the first row $R_1$ of the NW corn field depicted in FIG. 5C. Notably, the second annotation 530C indicates that there was torrential rain a few days ago, which may provide a natural language explanation helping to inform the human operator as to why the thirteenth crop $C_{13}$ is infected with the fungus (e.g., as indicated by the first annotation 520C).

In some implementations, and similar to the initial 3D rowview representation depicted in FIG. 5A and the subsequent 3D rowview representation depicted in FIG. 5B, information associated with the further subsequent 3D rowview representation of the first row $R_1$ of the NW corn field depicted in FIG. 5C can be provided. For example, based on the inference made with respect to the thirteenth crop $C_{13}$ (and/or any other inferences made based on processing the vision data utilized in generating the further subsequent 3D rowview representation), one or more notifications can be generated and provided for presentation to the human operator. For instance, notification 540C depicted in FIG. 5C includes a request for the human operator to verify the inference made with respect to at least the thirteenth crop $C_{13}$. Also, for example, based on the inference made with respect to the thirteenth crop $C_{13}$, such as verifying whether the thirteenth crop $C_{13}$ is, in fact, infected with a fungus. The human operator can review the further subsequent 3D rowview representation depicted in the portion 599 of the GUI 598, and direct user input to either a "yes" selectable element 540C1A or a "no" selectable element 540C1B to validate or invalidate the inference indicated by the first annotation 520C.

In some implementations, and similar to the initial 3D rowview representation depicted in FIG. 5A, the human operator can also be provided with an option 560 to specify a time and/or date of the displayed 3D rowview representation. In some implementations, the human operator can additionally or alternatively be provided with an additional option 570 to cause a 3D rowview time-lapse sequence of the first row $R_1$ of the NW corn field to be provided for playback at the portion 599 of the GUI 598. Notably, in the example of FIG. 5C, the 3D rowview time-lapse sequence of the first row $R_1$ of the NW corn field described with respect to FIG. 5B can be updated based on the further subsequent 3D rowview representation (e.g., to animate to additional days and the growth of the potential fungus between Sep. 16, 2021 at 2:30 PM and Sep. 18, 2021 at 2:30 PM).

Although FIGS. 5A, 5B, and 5C are described with respect to annotating the 3D rowview representations with indications of particular inferences and particular non-vision data across particular time instances, it should be understood that FIGS. 5A, 5B, and 5C are provided for the sake of example and are not meant to be limiting.

Turning now to FIG. 6, an example architecture of a robot 630 is schematically depicted. The robot 630 includes a robot control system 660, one or more operational components 640a-640n, and one or more sensors 642a-642m. The sensors 642a-642m may include, for example, vision components, light sensors, pressure sensors, pressure wave sensors (e.g., microphones), proximity sensors, accelerometers, gyroscopes, thermometers, barometers, GPS sensors, IMUs, wheel encoders, and so forth. While sensors 642a-642m are depicted as being integral with robot 630, this is not meant to be limiting. In some implementations, sensors 642a-642m may be located external to robot 630, e.g., as standalone units.

Operational components 640a-640n may include, for example, one or more end effectors and/or one or more servo motors or other actuators to effectuate movement of one or more components of the robot. For example, the robot 630 may have multiple degrees of freedom and each of the actuators may control actuation of the robot 630 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 630. In some implementations, the robot 630 may comprise a "brain box" that may include all or aspects of the control system 660. For example, the brain box may provide real time bursts of data to the operational components 640a-640n, with each of the real time bursts comprising a set of one or more control commands that dictate, inter alia, the parameters of motion (if any) for each of one or more of the operational components 640a-640n. In some implementations, the robot control system 660 may perform one or more aspects of methods 300 and/or 400 described herein.

As described herein, in some implementations all or aspects of the control commands generated by control system 660 in traversing a robotic component to a particular pose can be based on determining that particular pose is likely to result in successful performance of a task, as determined according to implementations described herein. Although control system 660 is illustrated in FIG. 6 as an integral part of the robot 630, in some implementations, all or aspects of the control system 660 may be implemented in a component that is separate from, but in communication with, robot 630. For example, all or aspects of control system 660 may be implemented on one or more computing devices that are in wired and/or wireless communication with the robot 630, such as computing device 710.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes obtaining initial vision data generated during an initial episode of one or more vision components being transported along a row of an agricultural field at an initial time instance, the initial time instance being one of a plurality of time instances; generating, based on the initial vision data, an initial three-dimensional rowview representation of the row of the agricultural field for the initial time instance; obtaining subsequent vision data generated during a subsequent episode of one or more of the vision components being transported along the row of the agricultural field at a subsequent time instance, the subsequent time instance also being one of the plurality of time instances; generating, based on the subsequent vision data, a subsequent three-dimensional rowview representation of the row of the agricultural field for the subsequent time instance; and causing the initial three-dimensional rowview representation and the subsequent three-dimensional rowview representation to be provided to a client device of a human operator of the agricultural field. the initial three-dimensional rowview representation enables the human operator to virtually traverse through the row of the agricultural field at the initial time instance, and the subsequent three-dimensional rowview representation enables the human operator to virtually traverse through the row of the agricultural field at the subsequent time instance.

These and other implementations of technology disclosed herein can optionally include one or more of the following features.

In some implementations, generating the initial three-dimensional rowview representation of the row of the agricultural field for the initial time instance may include processing, using a three-dimensional reconstruction technique, the initial vision data to generate the initial three-dimensional rowview representation of the row of the agricultural field for the initial time instance; and generating the subsequent three-dimensional rowview representation of the row of the agricultural field for the subsequent time instance may include processing, using the three-dimensional reconstruction technique, the subsequent vision data to generate the subsequent three-dimensional rowview representation of the row of the agricultural field for the subsequent time instance. In some versions of those implementations, the three-dimensional reconstruction technique may include one of: structure from motion, monocular cues, or stereo vision.

In some versions of those implementations, the method may further include processing, using a machine learning model, the initial vision data generated during the initial episode to make an initial inference with respect to at least one crop, included in the row of the agricultural field, at the initial time instance. Generating the initial three-dimensional rowview representation of the row of the agricultural field for the initial time instance may further include annotating the initial three-dimensional rowview representation of the row of the agricultural field to include an indication of the initial inference with respect to at least one crop at the initial time instance.

In some further versions of those implementations, the method may further include processing, using the machine learning model, the subsequent vision data generated during the subsequent episode to make a subsequent inference with respect to the at least one crop the subsequent time instance. Generating the subsequent three-dimensional rowview representation of the row of the agricultural field for the subsequent time instance may further include annotating the subsequent three-dimensional rowview representation of the row of the agricultural field to include an indication of the subsequent inference with respect to the at least one crop at the subsequent time instance.

In yet further versions of those implementations, the method may further include comparing the initial inference with respect to the at least one crop at the initial time instance with the subsequent inference with respect to the at least one crop at the subsequent time instance; and in response to determining that there is a difference between the initial inference with respect to the at least one crop at the initial time instance and the subsequent inference with respect to the at least one crop at the subsequent time instance: generating a notification that includes an indication of the difference between the initial inference with respect to the at least one crop at the initial time instance and the subsequent inference with respect to the at least one crop at the subsequent time instance; and causing the notification to be provided for presentation to the human operator of the agricultural field via the client device.

In yet further additional or alternative versions of those implementations, the initial inference with respect to the at least one crop at the initial time instance may include one of: a predicted yield inference, a predicted growth inference, a presence of pest inference, a presence of weeds inference, a presence of fungus inference, an irrigation inference, an undergrowth inference, a flooding inference, or a soil inference. In even yet further versions of those implementations, the subsequent inference with respect to the at least one crop at the subsequent time instance may be utilized to validate the initial inference with respect to the at least one crop at the initial time instance.

In yet further additional or alternative versions of those implementations, the method may further include generating, based on at least the initial three-dimensional rowview representation of the row of the agricultural field for the initial time instance and the subsequent three-dimensional rowview representation of the row of the agricultural field for the subsequent time instance, a three-dimensional rowview time-lapse sequence of the row of the agricultural field. In even yet further versions of those implementations, the three-dimensional rowview time-lapse sequence of the row of the agricultural field may include a rowview animation of the row of the agricultural field from at least the initial time instance to the subsequent time instance as represented by the initial three-dimensional rowview representation of the row of the agricultural field for the initial time instance evolving to the subsequent three-dimensional rowview representation of the row of the agricultural field for the subsequent time instance. The three-dimensional rowview time-lapse sequence of the row of the agricultural field may further include an annotation animation of inferences from at least the initial time instance to the subsequent time instance as represented by the indication of the initial inference with respect to the at least one crop at the initial time instance evolving to the indication of the subsequent inference with respect to the at least one crop at the subsequent time instance.

In some implementations, the method may further include obtaining initial non-vision data generated before or during the initial episode, the initial non-vision data being generated by one or more additional sensors that are in addition to the one or more vision components. In some versions of those implementations, the initial non-vision data may include weather data associated with a weather pattern before or during the initial episode. In additional or alternative versions of those implementations, generating the initial three-dimensional rowview representation of the row of the agricultural field for the initial time instance may include annotating the initial three-dimensional rowview representation of the row of the agricultural field to include an indication of the initial non-vision data generated before or during the initial episode.

In some implementations, the one or more vision components being transported through the row of the agricultural field may be mechanically coupled to a robot traversing through the row of the agricultural field at the initial time instance and the subsequent time instance, or the one or more vision components being transported through the row of the agricultural field may be mechanically coupled to farm machinery traversing through the row of the agricultural field at the initial time instance and the subsequent time instance.

In some implementations, a method implemented by one or more processors is provided, and includes obtaining initial vision data generated by one or more vision components at an initial time instance, the vision data capturing at least one crop of an agricultural field, and the initial time instance being one of a plurality of time instances; processing, using a machine learning model, the initial vision data generated by one or more of the vision components at the initial time instance to generate an initial inference with respect to the at least one crop; obtaining subsequent vision data generated by one or more of the vision components at a subsequent time instance, the additional vision data also capturing the at least one crop, and the subsequent time instance being one of the plurality of time instances; processing, using the machine learning model, the subsequent vision data generated by one or more of the vision components at the subsequent time instance to generate a subsequent inference with respect to the at least one crop; comparing the initial inference with respect to the at least one crop and the subsequent inference with respect to the at least one crop to generate an update for the machine learning model; and causing the machine learning model to be updated based on the update for the machine learning model.

These and other implementations of technology disclosed herein can optionally include one or more of the following features.

In some implementations, the method may further include obtaining initial non-vision data generated by one or more additional sensors at the initial time instance, the one or more additional sensors being in addition to the one or more vision components; and obtaining subsequent non-vision data generated by one or more of the additional sensors at the subsequent time instance.

In some versions of those implementations, the method may further include processing, using the machine learning model, and along with the initial vision data generated by one or more of the vision components at the initial time instance, the initial non-vision data generated by one or more of the additional sensors at the initial time instance to generate the initial inference with respect to the at least one crop; and processing, using the machine learning model, and along with the subsequent vision data generated by one or more of the vision components at the subsequent time instance, the subsequent non-vision data generated by one or more of the additional sensors at the subsequent time instance to generate the subsequent inference with respect to the at least one crop.

In some versions of those implementations, the initial non-vision data may include weather data associated with an initial weather pattern at the initial time instance, and the subsequent non-vision data may include weather data associated with a subsequent weather pattern at the subsequent time instance.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   obtaining initial vision data of a first row and a second row of an agricultural field, wherein a length of the first row is longer than a width of the first row, and the initial vision data is generated during an initial episode of a vision component being transported along the length of the first row of the agricultural field at an initial time instance of a plurality of time instances, wherein the initial vision data includes data corresponding to the first row and the second row of the agricultural field at an initial location corresponding to the initial time instance, wherein the second row is parallel to the first row and located on a same side of the vision component as the first row, and wherein the width of the first row is closer to the vision component than a width of the second row;
   generating, based on the initial vision data, an initial three-dimensional rowview representation of the first row and the second row of the agricultural field for the initial time instance;
   processing, using a machine learning model, the initial vision data generated during the initial episode to make an initial inference with respect to at least one crop included in the first row or the second row of the agricultural field at the initial time instance;
   obtaining subsequent vision data of the first row and the second row of the agricultural field, the subsequent vision data generated during a subsequent episode of the vision component being transported along the length of the first row of the agricultural field at a subsequent time instance of the plurality of time instances, wherein the subsequent vision data includes data corresponding to the first row and the second row of the agricultural field at a subsequent location corresponding to the subsequent time instance;
   generating, based on the subsequent vision data, a subsequent three-dimensional rowview representation of the first row and the second row of the agricultural field for the subsequent time instance;

processing, using the machine learning model, the subsequent vision data generated during the subsequent episode to make a subsequent inference with respect to the at least one crop at the subsequent time instance;

causing the initial three-dimensional rowview representation and the subsequent three-dimensional rowview representation to be provided to a client device of a human operator,
- wherein the initial three-dimensional rowview representation enables the human operator to virtually traverse along the first row and the second row of the agricultural field at the initial time instance, and
- wherein the subsequent three-dimensional rowview representation enables the human operator to virtually traverse along the first row and the second row of the agricultural field at the subsequent time instance;

comparing the initial inference with respect to the at least one crop at the initial time instance with the subsequent inference with respect to the at least one crop at the subsequent time instance to generate an update for the machine learning model, wherein to generate the update includes:
- generating, based on the initial inference with respect to the at least one crop and the subsequent inference with respect to the at least one crop, a first notification that requests the human operator to validate the initial inference with respect to the at least one crop and the subsequent inference with respect to the at least one crop; and
- generating, based on user input in response to the first notification, one or more training examples for the machine learning model; and causing the machine learning model to be updated based on the one or more training examples for the machine learning model; and in response to determining that there is a difference between the initial inference with respect to the at least one crop at the initial time instance and the subsequent inference with respect to the at least one crop at the subsequent time instance:
- determining, based on the difference between the initial inference with respect to the at least one crop at the initial time instance and the subsequent inference with respect to the at least one crop at the subsequent time instance, one or more recommended actions to be performed with respect to the at least one crop;
- generating a second notification that includes: (i) an indication of the difference between the initial inference with respect to the at least one crop at the initial time instance and the subsequent inference with respect to the at least one crop at the subsequent time instance, and (ii) an additional indication of the one or more recommended actions to be performed with respect to the at least one crop; and
- causing the second notification to be provided for presentation to the human operator via the client device.

2. The method of claim 1,
wherein generating the initial three-dimensional rowview representation of the first row and the second row of the agricultural field for the initial time instance includes processing, using a three-dimensional reconstruction technique, the initial vision data to generate the initial three-dimensional rowview representation of the first row and the second row of the agricultural field for the initial time instance; and
wherein generating the subsequent three-dimensional rowview representation of the first row and the second row of the agricultural field for the subsequent time instance includes processing, using the three-dimensional reconstruction technique, the subsequent vision data to generate the subsequent three-dimensional rowview representation of the first row and the second row of the agricultural field for the subsequent time instance.

3. The method of claim 2, wherein the three-dimensional reconstruction technique includes one of: structure from motion, monocular cues, or stereo vision.

4. The method of claim 2, wherein generating the initial three-dimensional rowview representation of the first row and the second row of the agricultural field for the initial time instance further includes annotating the initial three-dimensional rowview representation of the first row and the second row of the agricultural field to include a first indication of the initial inference with respect to the at least one crop at the initial time instance.

5. The method of claim 4, wherein generating the subsequent three-dimensional rowview representation of the first row and the second row of the agricultural field for the subsequent time instance further includes annotating the subsequent three-dimensional rowview representation of the first row and the second row of the agricultural field to include a second indication of the subsequent inference with respect to the at least one crop at the subsequent time instance.

6. The method of claim 1, wherein the initial inference with respect to the at least one crop at the initial time instance includes one of: a predicted yield inference, a predicted growth inference, a presence of pest inference, a presence of weeds inference, a presence of fungus inference, an irrigation inference, an undergrowth inference, a flooding inference, or a soil inference.

7. The method of claim 6, wherein the subsequent inference with respect to the at least one crop at the subsequent time instance is utilized to validate the initial inference with respect to the at least one crop at the initial time instance.

8. The method of claim 1, further including generating, based on at least the initial three-dimensional rowview representation of the first row and the second row of the agricultural field for the initial time instance and the subsequent three-dimensional rowview representation of the first row and the second row of the agricultural field for the subsequent time instance, a three-dimensional rowview time-lapse sequence of the first row and the second row of the agricultural field.

9. The method of claim 8, wherein the three-dimensional rowview time-lapse sequence of the first row and the second row of the agricultural field includes a rowview animation of the first row and the second row of the agricultural field from at least the initial time instance to the subsequent time instance as represented by the initial three-dimensional rowview representation of the first row and the second row of the agricultural field for the initial time instance evolving to the subsequent three-dimensional rowview representation of the first row and the second row of the agricultural field for the subsequent time instance.

10. The method of claim 9, wherein the three-dimensional rowview time-lapse sequence of the first row and the second row of the agricultural field further includes an annotation including an animation of inferences from at least the initial time instance to the subsequent time instance as represented by a first indication of the initial inference with respect to the at least one crop at the initial time instance evolving to a second indication of the subsequent inference with respect to the at least one crop at the subsequent time instance.

11. The method of claim 1, further including obtaining initial non-vision data generated before or during the initial time instance, the initial non-vision data being generated by a sensor that is in addition to the vision component.

12. The method of claim 11, wherein the initial non-vision data includes weather data associated with a weather pattern before or during the initial time instance.

13. The method of claim 11, wherein generating the initial three-dimensional rowview representation of the first row and the second row of the agricultural field for the initial time instance includes annotating the initial three-dimensional rowview representation of the first row and the second row of the agricultural field to include a first indication of the initial non-vision data generated before or during the initial time instance.

14. The method of claim 1,
wherein the vision component being transported along the length of the first row of the agricultural field is mechanically coupled to a robot traversing along the length of the first row of the agricultural field at the initial time instance and the subsequent time instance, or
wherein the vision component being transported along the length of the first row of the agricultural field is mechanically coupled to farm machinery traversing along the length of the first row of the agricultural field at the initial time instance and the subsequent time instance.

15. The method of claim 1, wherein the difference between the initial inference with respect to the at least one crop at the initial time instance and the subsequent inference with respect to the at least one crop at the subsequent time instance is annotated on the subsequent three-dimensional rowview representation when the human operator is viewing the subsequent three-dimensional rowview representation.

16. A method implemented by one or more processors, the method comprising:
obtaining initial vision data of a first row and a second row of an agricultural field, wherein a length of the first row is longer than a width of the first row, the initial vision data is generated by a vision component transported along the length of the first row at an initial time instance of a plurality of time instances, the initial vision data includes data corresponding to the first row and the second row of the agricultural field at an initial location corresponding to the initial time instance, wherein the second row is parallel to the first row and located on a same side of the vision component as the first row, and wherein the width of the first row is closer to the vision component than a width of the second row;
generating, based on the initial vision data, an initial three-dimensional rowview representation of the first row and the second row of the agricultural field for the initial time instance;
processing, using a machine learning model, the initial vision data generated by the vision component at the initial time instance to generate an initial inference with respect to at least one crop included in the first row or the second row of the agricultural field at the initial time instance;
obtaining subsequent vision data of the first row and the second row of the agricultural field, the subsequent vision data generated by the vision component at a subsequent time instance of one of the plurality of time instances, the subsequent vision data includes data corresponding to the first row and the second row of the agricultural field at a subsequent location corresponding to the subsequent time instance;
generating, based on the subsequent vision data, a subsequent three dimensional rowview representation of the first row and the second row of the agricultural field for the subsequent time instance;
processing, using the machine learning model, the subsequent vision data generated by the vision component at the subsequent time instance to generate a subsequent inference with respect to the at least one crop included in the first row or the second row of the agricultural field at the subsequent time instance;
causing the initial three-dimensional rowview representation and the subsequent three-dimensional rowview representation to be provided to a client device of a human operator,
wherein the initial three-dimensional rowview representation enables the human operator to virtually traverse along the first row and the second row of the agricultural field at the initial time instance, and wherein the subsequent three-dimensional rowview representation enables the human operator to virtually traverse along the first row and the second row at the subsequent time instance;
comparing the initial inference with respect to the at least one crop and the subsequent inference with respect to the at least one crop to generate an update for the machine learning model, wherein comparing the initial inference with respect to the at least one crop and the subsequent inference with respect to the at least one crop to generate the update for the machine learning model includes:
generating, based on the initial inference with respect to the at least one crop and the subsequent inference with respect to the at least one crop, a notification that requests the human operator to validate the initial inference with respect to the at least one crop and the subsequent inference with respect to the at least one crop;
causing the notification to be provided for presentation to the human operator via the client device of the human operator;
receiving user input that validates or invalidates the initial inference with respect to the at least one crop and/or the subsequent inference with respect to the at least one crop; and
generating, based on the user input, one or more training examples for the machine learning model; and
causing the machine learning model to be updated based on the one or more training examples for the machine learning model.

17. The method of claim 16, further including:
obtaining initial non-vision data generated by one or more additional sensors at the initial time instance, the one or more additional sensors being in addition to the vision component; and obtaining subsequent non-vision data generated by the one or more additional sensors at the subsequent time instance.

18. The method of claim 17, further including:

processing, using the machine learning model and the initial vision data generated by the vision component at the initial time instance, the initial non-vision data generated by the one or more additional sensors at the initial time instance to generate the initial inference with respect to the at least one crop; and processing, using the machine learning model and the subsequent vision data generated by the vision component at the subsequent time instance, the subsequent non-vision data generated by the one or more additional sensors at the subsequent time instance to generate the subsequent inference with respect to the at least one crop.

19. The method of claim 17, wherein the initial non-vision data includes weather data associated with an initial weather pattern at the initial time instance, and wherein the subsequent non-vision data includes weather data associated with a subsequent weather pattern at the subsequent time instance.

20. A system comprising:

at least one processor; and memory storing instructions that, when executed, cause the at least one processor to perform operations, the operations including:

obtaining initial vision data of a first row and a second row of an agricultural field, wherein a length of the first row is longer than a width of the first row, and the initial vision data is generated during an initial episode of a vision component being transported along the length of the first row of the agricultural field at an initial time instance of a plurality of time instances, wherein the initial vision data includes data corresponding to the first row and the second row of the agricultural field at an initial location corresponding to the initial time instance, wherein the second row is parallel to the first row and located on a same side of the vision component as the first row, and wherein the width of the first row is closer to the vision component than a width of the second row;

generating, based on the initial vision data, an initial three-dimensional rowview representation of the first row and the second row of the agricultural field for the initial time instance;

processing, using a machine learning model, the initial vision data generated during the initial episode to make an initial inference with respect to at least one crop included in the first row or the second row of the agricultural field at the initial time instance;

obtaining subsequent vision data of the first row and the second row of the agricultural field, the subsequent vision data is generated during a subsequent episode of the vision component being transported along the length of the first row of the agricultural field at a subsequent time instance of the plurality of time instances, wherein the subsequent vision data also includes data corresponding to the first row and the second row of the agricultural field at a subsequent location corresponding to the subsequent time instance;

generating, based on the subsequent vision data, a subsequent three-dimensional rowview representation of the first row and the second row of the agricultural field for the subsequent time instance;

processing, using the machine learning model, the subsequent vision data generated during the subsequent episode to make a subsequent inference with respect to the at least one crop at the subsequent time instance;

causing the initial three-dimensional rowview representation and the subsequent three-dimensional rowview representation to be provided to a client device of a human operator, wherein the initial three-dimensional rowview representation enables the human operator to virtually traverse along the first row and the second row of the agricultural field at the initial time instance, and wherein the subsequent three-dimensional rowview representation enables the human operator to virtually traverse along the first row and the second row of the agricultural field at the subsequent time instance;

compare the initial inference with respect to the at least one crop at the initial time instance with the subsequent inference with respect to the at least one crop at the subsequent time instance to generate an update for the machine learning model, wherein to generate the update includes to:

generate, based on the initial inference with respect to the at least one crop and the subsequent inference with respect to the at least one crop, a first notification that requests the human operator to validate the initial inference with respect to the at least one crop and the subsequent inference with respect to the at least one crop; and generate, based on user input in response to the first notification, one or more training examples for the machine learning model; and cause the machine learning model to be updated based on the one or more training examples for the machine learning model; and in response to determining that there is a difference between the initial inference with respect to the at least one crop at the initial time instance and the subsequent inference with respect to the at least one crop at the subsequent time instance:

determine, based on the difference between the initial inference with respect to the at least one crop at the initial time instance and the subsequent inference with respect to the at least one crop at the subsequent time instance, one or more recommended actions to be performed with respect to the at least one crop;

generate a second notification that includes: (i) an indication of the difference between the initial inference with respect to the at least one crop at the initial time instance and the subsequent inference with respect to the at least one crop at the subsequent time instance, and (ii) an additional indication of the one or more recommended actions to be performed with respect to the at least one crop; and cause the second notification to be provided for presentation to the human operator via the client device.

* * * * *